US011971496B2

United States Patent
Cha et al.

(10) Patent No.: US 11,971,496 B2
(45) Date of Patent: Apr. 30, 2024

(54) METHOD FOR REPORTING INFORMATION RELATED TO REFERENCE SIGNAL MEASUREMENT, AND APPARATUS THEREFOR

(71) Applicant: LG ELECTRONICS INC., Seoul (KR)

(72) Inventors: Hyunsu Cha, Seoul (KR); Hyunsoo Ko, Seoul (KR); Kijun Kim, Seoul (KR); Youngsub Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 509 days.

(21) Appl. No.: 17/280,836

(22) PCT Filed: Sep. 27, 2019

(86) PCT No.: PCT/KR2019/012582
§ 371 (c)(1),
(2) Date: Mar. 26, 2021

(87) PCT Pub. No.: WO2020/067764
PCT Pub. Date: Apr. 2, 2020

(65) Prior Publication Data
US 2022/0003830 A1    Jan. 6, 2022

Related U.S. Application Data

(60) Provisional application No. 62/738,930, filed on Sep. 28, 2018.

(51) Int. Cl.
*G01S 5/00*    (2006.01)
*G01S 5/02*    (2010.01)
(Continued)

(52) U.S. Cl.
CPC .......... *G01S 5/0036* (2013.01); *G01S 5/0221* (2013.01); *G01S 5/10* (2013.01); *H04L 5/0048* (2013.01);
(Continued)

(58) Field of Classification Search
CPC ........ G01S 5/0036; G01S 5/0221; G01S 5/10; H04L 5/0048; H04W 24/08; H04W 24/10; H04W 56/001
(Continued)

(56) References Cited

U.S. PATENT DOCUMENTS

2016/0156424 A1*  6/2016  Mirbagheri ............ H04J 11/004
375/227
2016/0295366 A1   10/2016  Priyanto et al.
(Continued)

FOREIGN PATENT DOCUMENTS

CA    3042346 A1 *  5/2018  ........... G01S 5/0036
EP    3171194 A1 *  5/2017  .............. G01S 11/08
(Continued)

OTHER PUBLICATIONS

PCT International Application No. PCT/KR2019/012582 International Search Report dated Jan. 22, 2020, 18 pages.
(Continued)

*Primary Examiner* — Harry K Liu
(74) *Attorney, Agent, or Firm* — LEE, HONG, DEGERMAN, KANG & WAIMEY

(57) ABSTRACT

Disclosed is a method for a terminal to report information related to reference signal measurement in a wireless communication system. In particular, the disclosed method is characterized by comprising: receiving a plurality of reference signals; measuring a time of arrival (ToA) for each of the plurality of reference signals; and transmitting identifi-
(Continued)

(A) CONTROL-PLANE PROTOCOL STACK (B) USER-PLANE PROTOCOL STACK cation information on the reference signal having the smallest ToA among the plurality of reference signals.

13 Claims, 28 Drawing Sheets

(51) Int. Cl.
| | |
|---|---|
| *G01S 5/10* | (2006.01) |
| *H04L 5/00* | (2006.01) |
| *H04W 24/08* | (2009.01) |
| *H04W 24/10* | (2009.01) |
| *H04W 56/00* | (2009.01) |

(52) U.S. Cl.
CPC .......... *H04W 24/08* (2013.01); *H04W 24/10* (2013.01); *H04W 56/001* (2013.01)

(58) Field of Classification Search
USPC ........................................... 342/464
See application file for complete search history.

(56) References Cited

U.S. PATENT DOCUMENTS

| | | |
|---|---|---|
| 2017/0366992 A1 | 12/2017 | Rune et al. |
| 2018/0077679 A1 | 3/2018 | Lee et al. |
| 2018/0176801 A1 | 6/2018 | Rune |
| 2018/0302873 A1* | 10/2018 | Kazmi .................. H04W 24/10 |
| 2023/0189344 A1* | 6/2023 | Su ..................... H04W 74/0833 |
| | | 370/329 |

FOREIGN PATENT DOCUMENTS

| | | | | |
|---|---|---|---|---|
| EP | 3282275 A1 * | 2/2018 | ........... | G01S 5/0036 |
| EP | 3383071 A1 * | 10/2018 | ............... | G01S 5/02 |
| KR | 20140073677 | 6/2014 | | |
| WO | WO-2016155775 A1 * | 10/2016 | ............... | G01S 5/10 |
| WO | 2018028787 | 2/2018 | | |
| WO | WO-2019162513 A1 * | 8/2019 | ............ | H04W 24/10 |

OTHER PUBLICATIONS

European Patent Office Application Serial No. 19865994.8, Search Report dated May 24, 2022, 9 pages.

* cited by examiner

FIG. 1
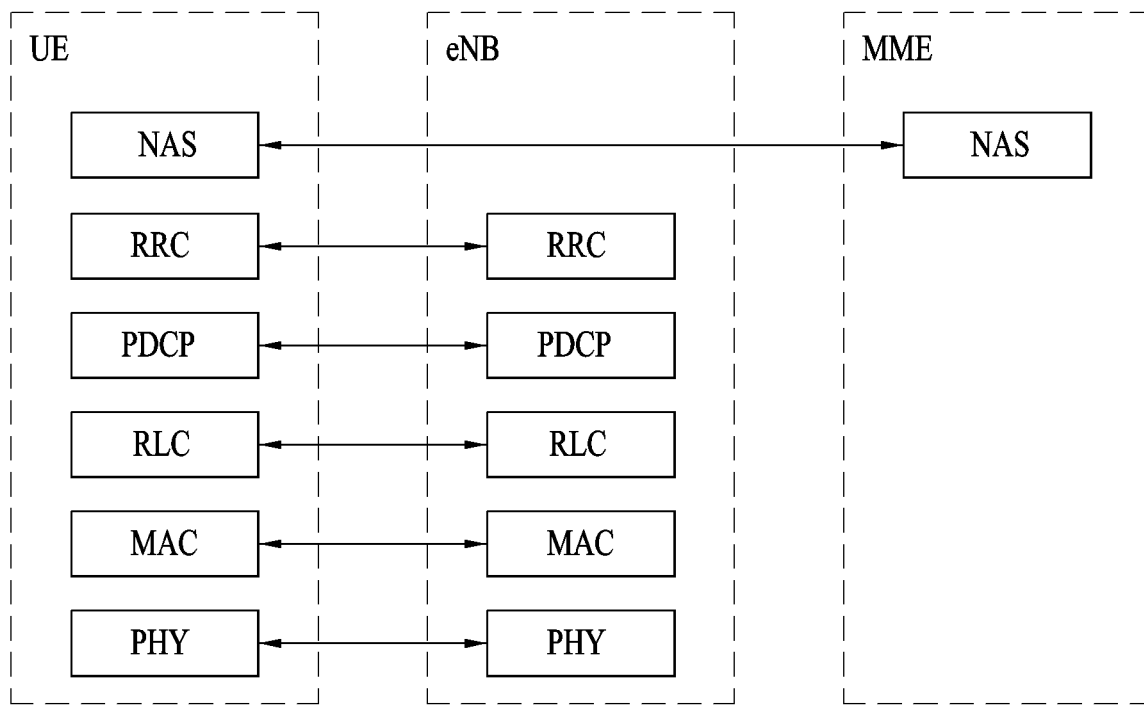
(A) CONTROL-PLANE PROTOCOL STACK
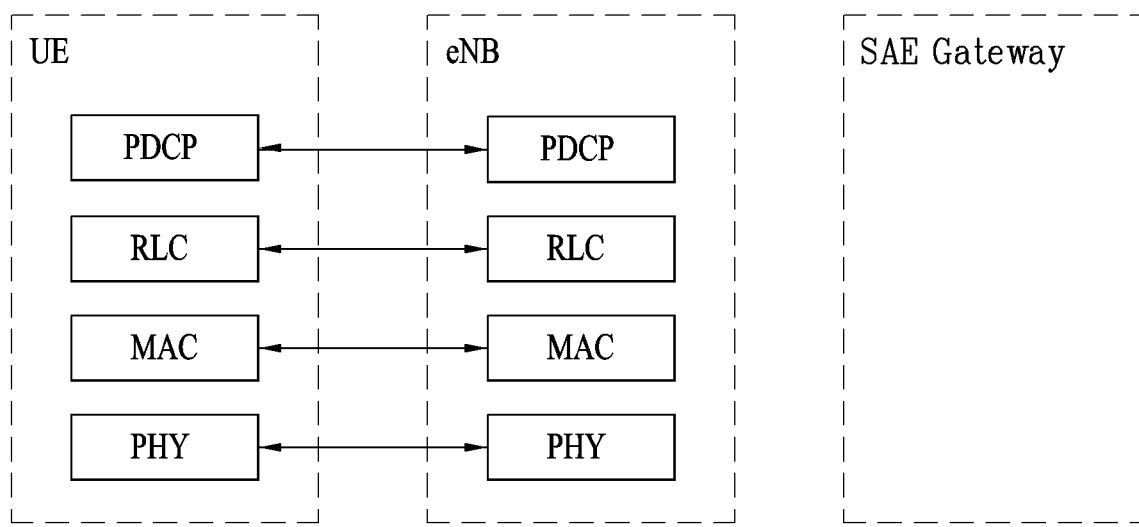
(B) USER-PLANE PROTOCOL STACK

FIG. 9
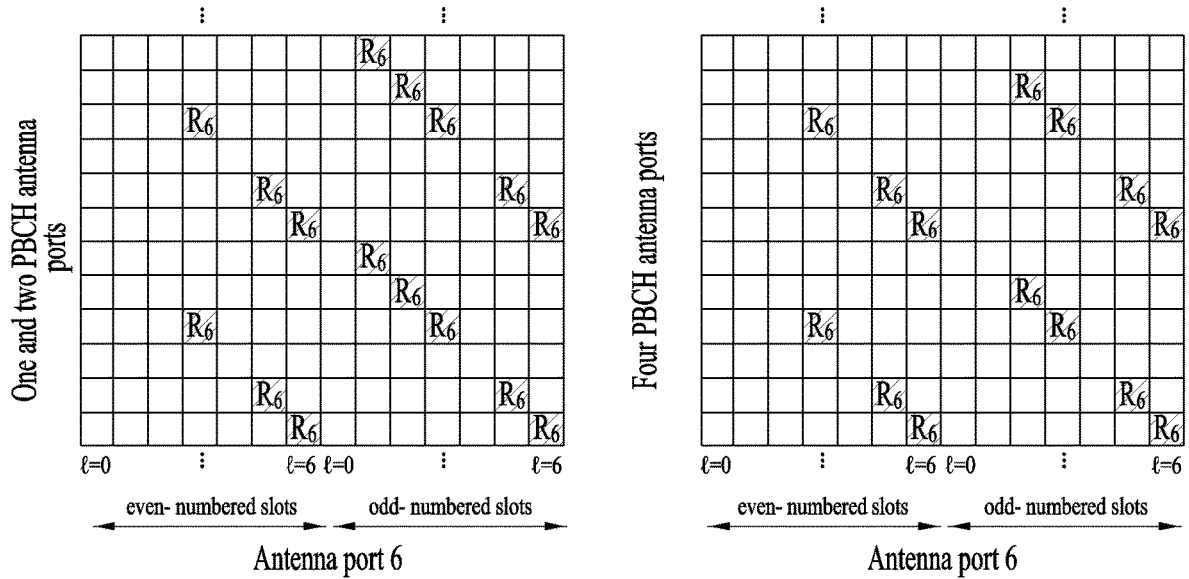
(a)
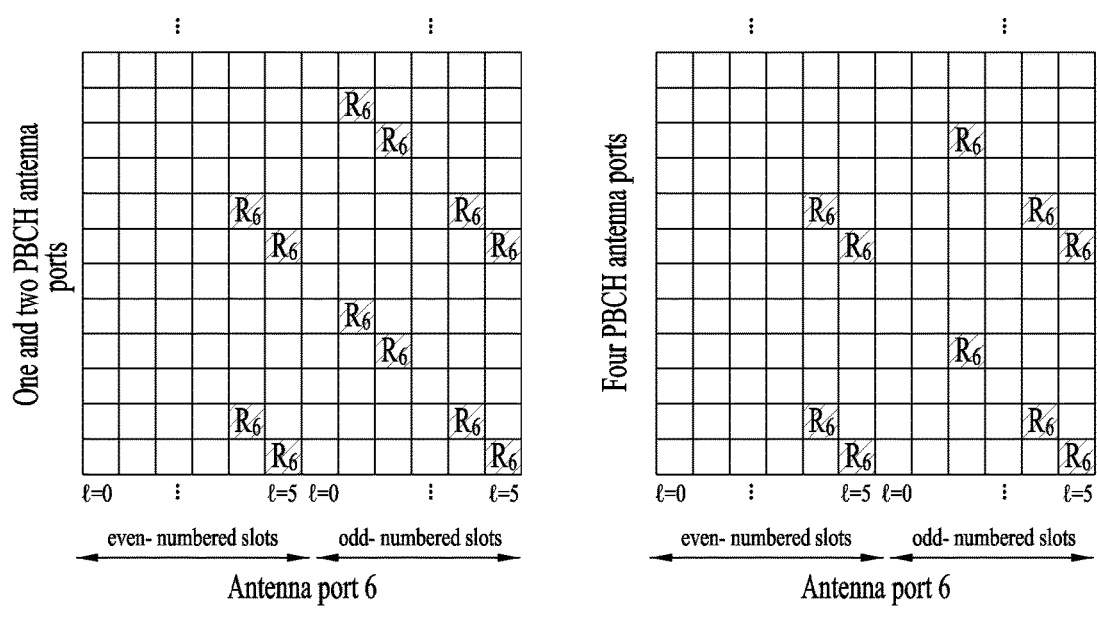
(b)

FIG. 19
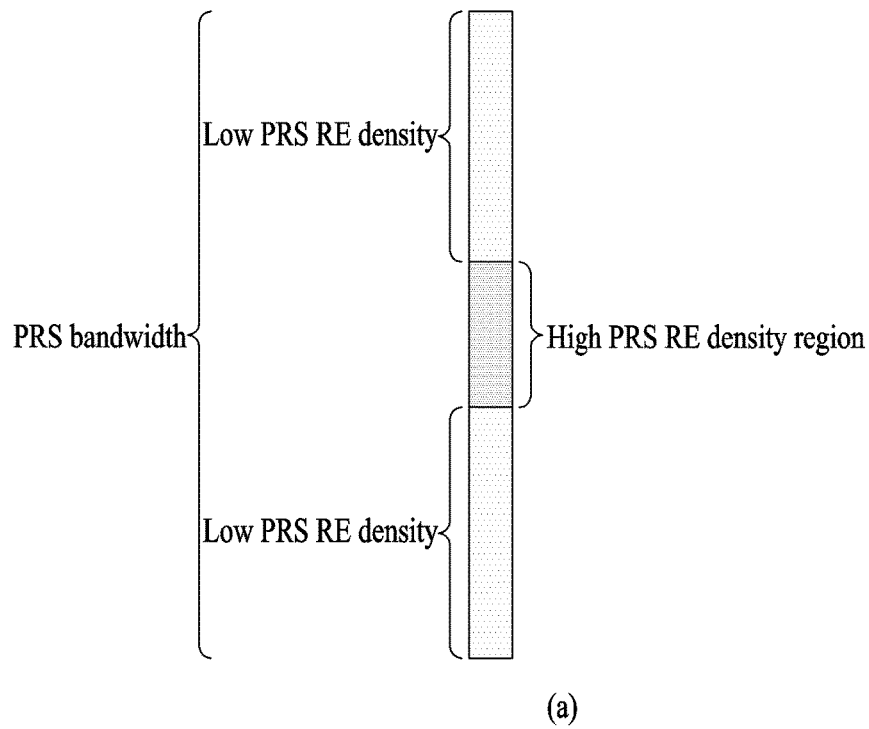
(a)
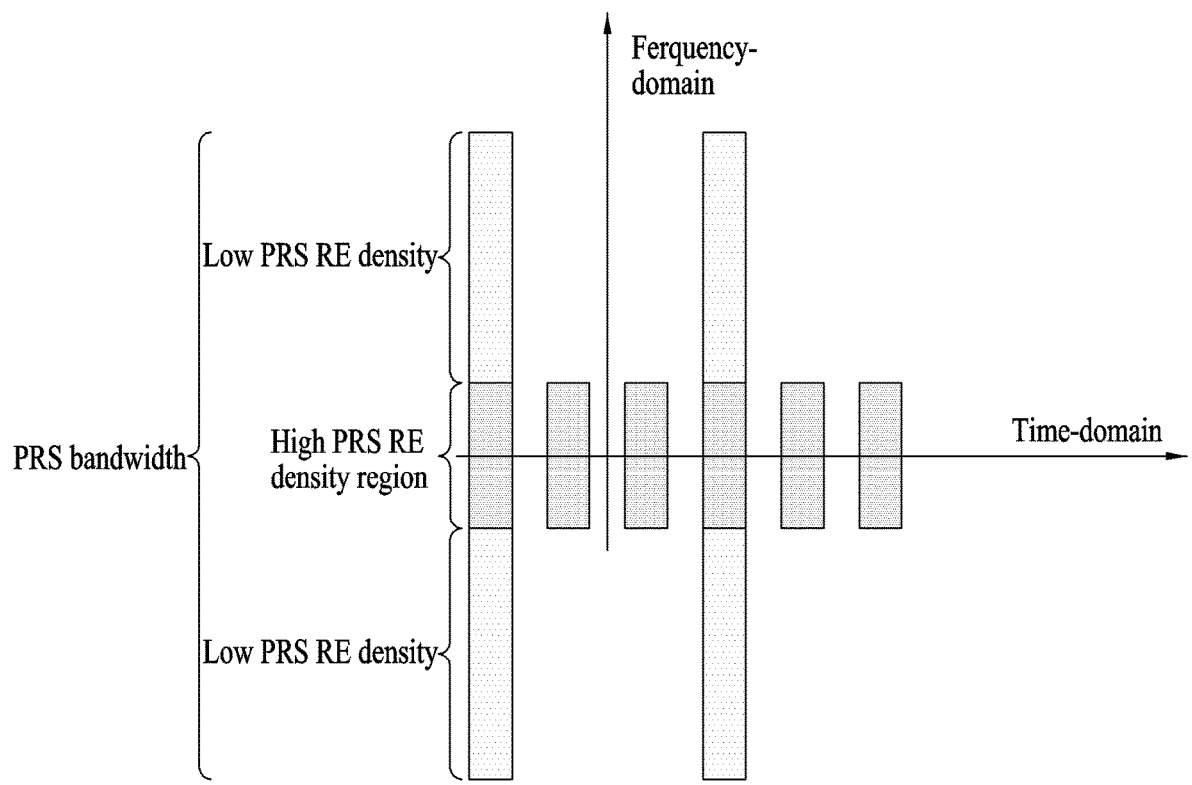
(b)

FIG. 20
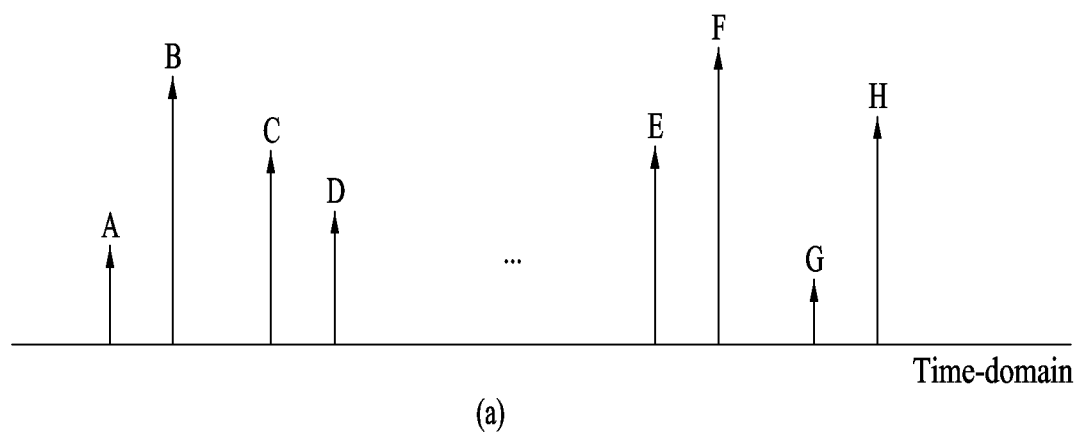
(a)
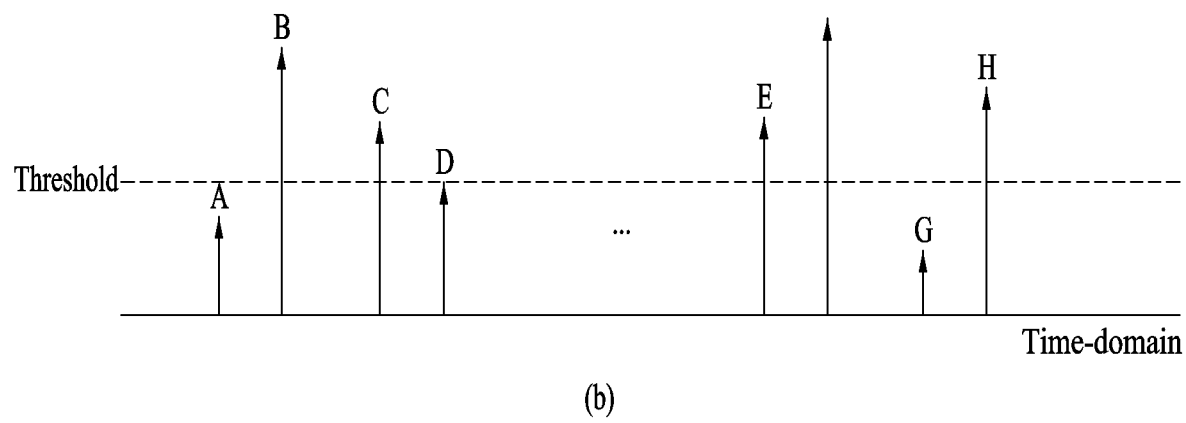
(b)

METHOD FOR REPORTING INFORMATION RELATED TO REFERENCE SIGNAL MEASUREMENT, AND APPARATUS THEREFOR

CROSS-REFERENCE TO RELATED APPLICATIONS

This application is the National Stage filing under 35 U.S.C. 371 of International Application No. PCT/KR2019/012582, filed on Sep. 27, 2019, which claims the benefit of U.S. Provisional Application Ser. No. 62/738,930, filed on Sep. 28, 2018, the contents of which are all hereby incorporated by reference herein in their entirety.

TECHNICAL FIELD

The present disclosure relates to a method of reporting information related to reference signal measurement and apparatus therefor and, more particularly, to a method of reporting information related to reference signal measurement required to estimate a location of a user equipment (UE) and apparatus therefor.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

The object of the present disclosure is to provide a method of reporting information related to reference signal measurement and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of reporting information related to reference signal measurement by a user equipment (UE) in a wireless communication system is provided. The method may include: receiving a plurality of reference signals; measuring a time of arrival (ToA) for each of the plurality of reference signals; and transmitting identification information of a reference signal with the smallest ToA among the plurality of reference signals.

The method may further include measuring a reference signal received power (RSRP) for each of the plurality of reference signals, and the transmission of the identification information may include transmitting identification information of a reference signal with a smallest ToA among reference signals having RSRPs greater than or equal to a threshold.

The method may further include measuring an RSRP for each of the plurality of reference signals and transmitting an RSRP of the reference signal related to the identification information.

The plurality of reference signals may be a plurality of synchronization signal/physical broadcast channel (SS/PBCH) blocks, and the identification information of the reference signal may be an index of an SS/PBCH block.

The plurality of reference signals may be a plurality of channel state information reference signal (CSI-RS) resources included in one CSI-RS resource set, and the identification information of the reference signal may be a CSI-RS resource indicator (CRI).

The plurality of reference signals may be a plurality of positioning reference signal (PRS) resources included in one PRS resource set, and the identification information of the reference signal may be a PRS index.

The plurality of reference signals may be transmitted in a first frequency band and a second frequency band, and a reference signal density of the first frequency band may be different from a reference signal density of the second frequency band.

The plurality of reference signals may be transmitted in a first frequency band and a second frequency band, and a number of reference signal repetitions in the first frequency band may be different from a number of reference signal repetitions in the second frequency band.

The plurality of reference signals may be for observed time difference of arrival (OTDOA) based positioning.

Each of the plurality of reference signals may be mapped to a plurality of symbols, and each of the plurality of reference signals may be mapped to one resource element (RE) for each of the plurality of symbols.

Each of the plurality of reference signals may be related to a different transmission beam.

The UE may be capable of communicating with at least one of another UE other than the UE, a network, a base station, or an autonomous driving vehicle.

In another aspect of the present disclosure, an apparatus for reporting information related to reference signal measurement in a wireless communication system is provided. The apparatus may include: at least one processor; and at least one memory operably connected to the at least one processor and configured to store instructions that, when executed, cause the at least one processor to perform operations including: receiving a plurality of reference signals; measuring a ToA for each of the plurality of reference signals; and transmitting identification information of a reference signal with a smallest ToA among the plurality of reference signals.

In a further aspect of the present disclosure, a UE for reporting information related to reference signal measurement in a wireless communication system is provided. The UE may include: at least one transceiver; at least one processor; and at least one memory operably connected to the at least one processor and configured to store instructions that, when executed, cause the at least one processor to perform operations including: receiving a plurality of reference signals through the at least one transceiver; measuring a ToA for each of the plurality of reference signals; and transmitting identification information of a reference signal with a smallest ToA among the plurality of reference signals through the at least one transceiver.

Advantageous Effects

According to the present disclosure, the location of a user equipment (UE) may be more efficiently estimated.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 is a diagram illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.

FIG. 9 illustrates an exemplary pattern to which a positioning reference signal (PRS) is mapped in a subframe in LTE system.

FIG. 19 illustrates an embodiment of allocating positioning reference signals (PRSs) according to the present disclosure.

FIG. 20 illustrates an embodiment of reporting location information according to the present disclosure.

BEST MODE

Figure 2:
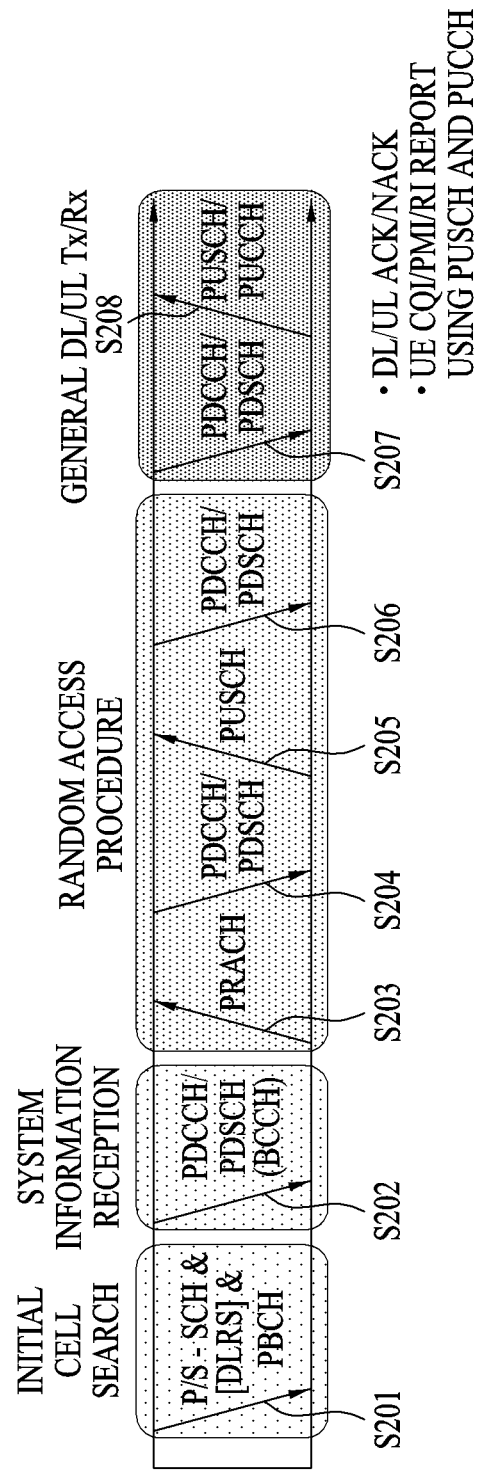
FIG. 2 is a diagram illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

The NR system adopts the OFDM transmission scheme or a similar transmission scheme. Specifically, the NR system may use OFDM parameters different from those in LTE. Further, the NR system may follow the legacy LTE/LTE-A numerology but have a larger system bandwidth (e.g., 100 MHz). Further, one cell may support a plurality of numerologies in the NR system. That is, UEs operating with different numerologies may coexist within one cell.

Figure 3:
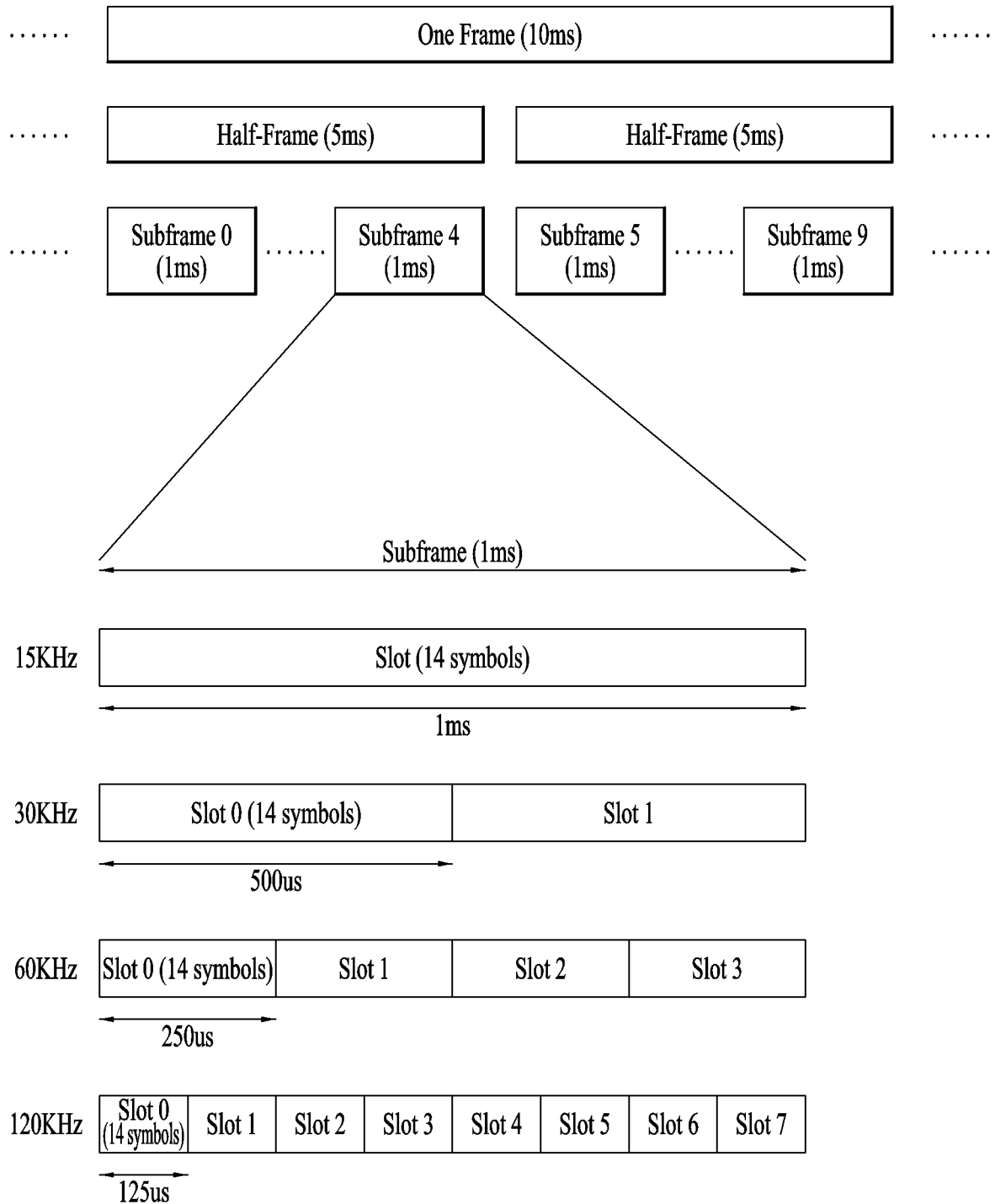
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
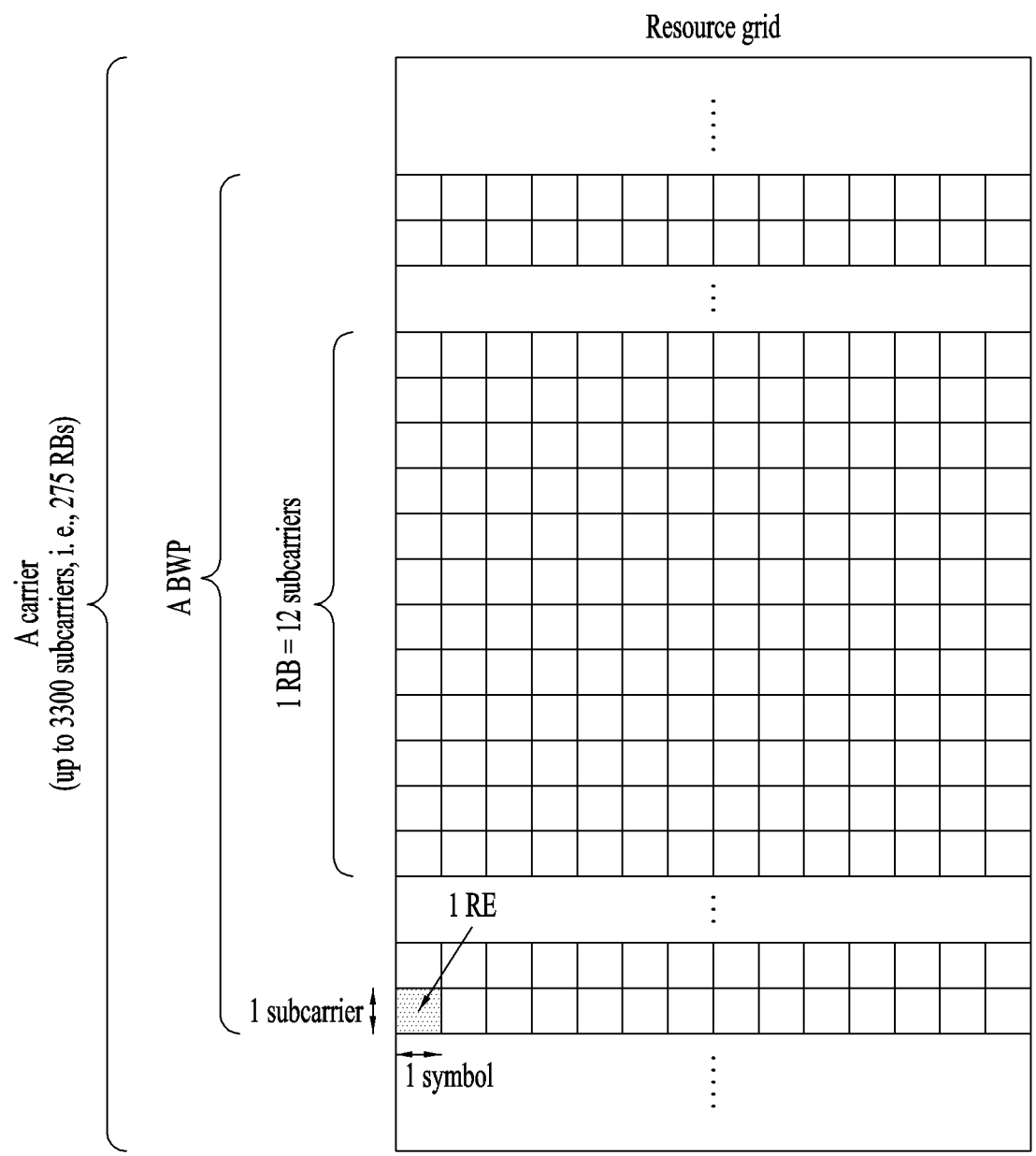
Figure 5:
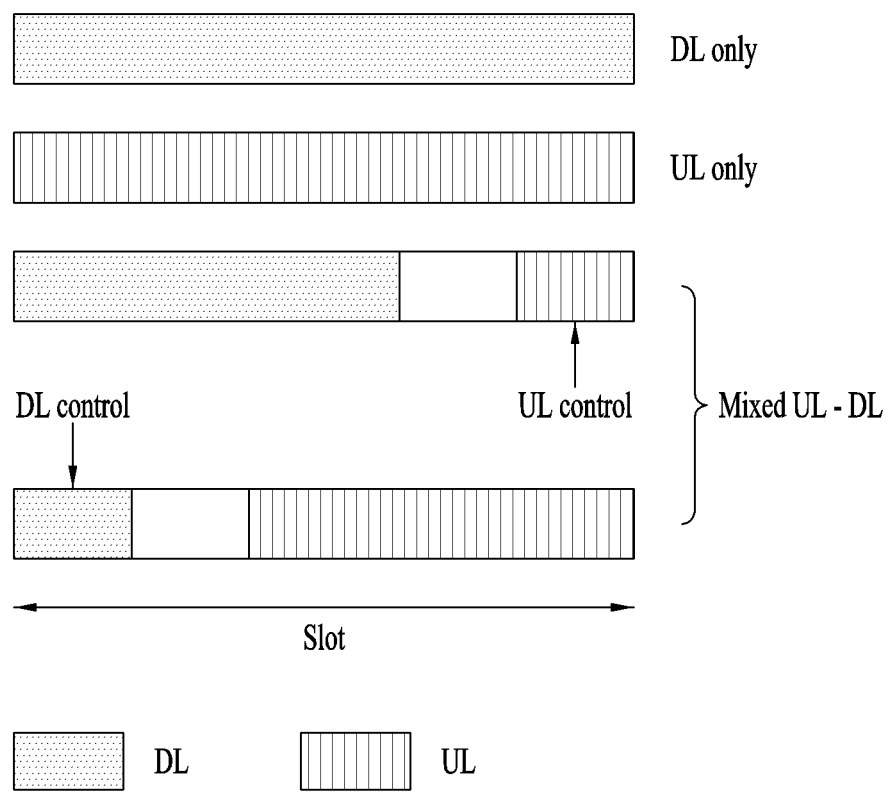

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., 4) BWPs. Data communication is performed through an activated BWP, and only one BWP may be activated for one UE. In the resource grid, each element is referred to as a resource element (RE), and one complex symbol may be mapped thereto FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration

DL region+Guard period (GP)+UL control region
DL control region+GP+UL region
DL region: (i) DL data region, (ii) DL control region+DL data region
UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
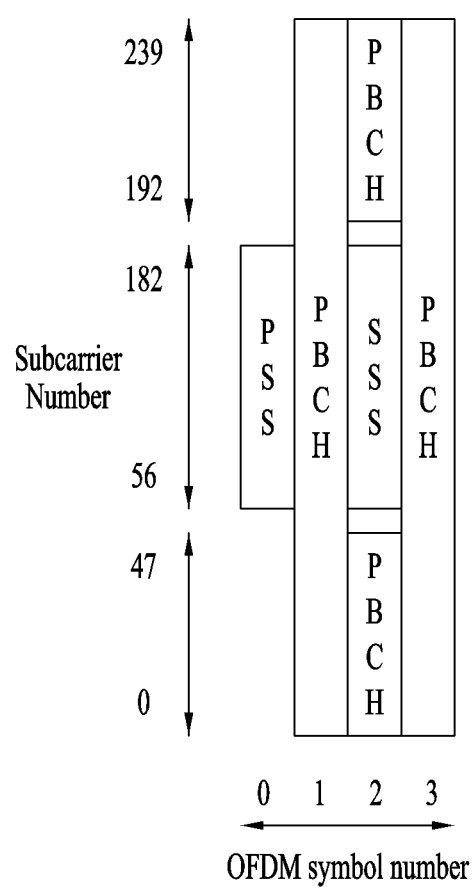
FIGS. 6 and 7 are diagrams illustrating the composition of a synchronization signal/physical broadcast channel (SS/PBCH) block and a method of transmitting an SS/PBCH block.

FIG. 6 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 6, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| | Type of Signals | Operations |
|---|---|---|
| $1^{st}$ step | PSS | SS/PBCH block (SSB) symbol timing acquisition Cell ID detection within a cell ID group (3 hypothesis) |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF) Remaining Minimum System Information (RMSI) Control resource set (CORESET)/Search space configuration |

TABLE 3-continued

| | Type of Signals | Operations |
|---|---|---|
| $5^{th}$ Step | PDCCH and PDSCH | Cell access information RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 7:
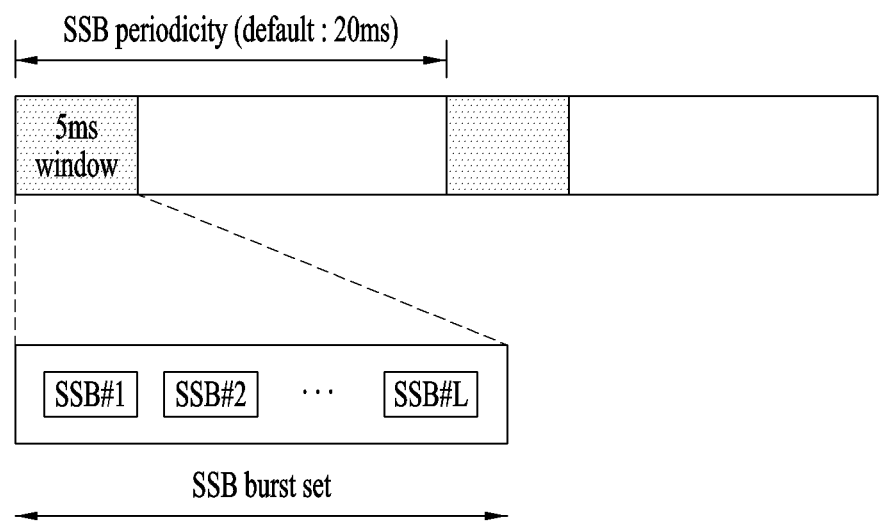

FIG. 7 illustrates SSB transmission. Referring to FIG. 7, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

CSI-Related Operations

In the NR system, a CSI-RS is used for time/frequency tracking, CSI computation, reference signal received power (RSRP) calculation, and mobility. CSI computation is related to CSI acquisition, and RSRP computation is related to beam management (BM).

Figure 8:
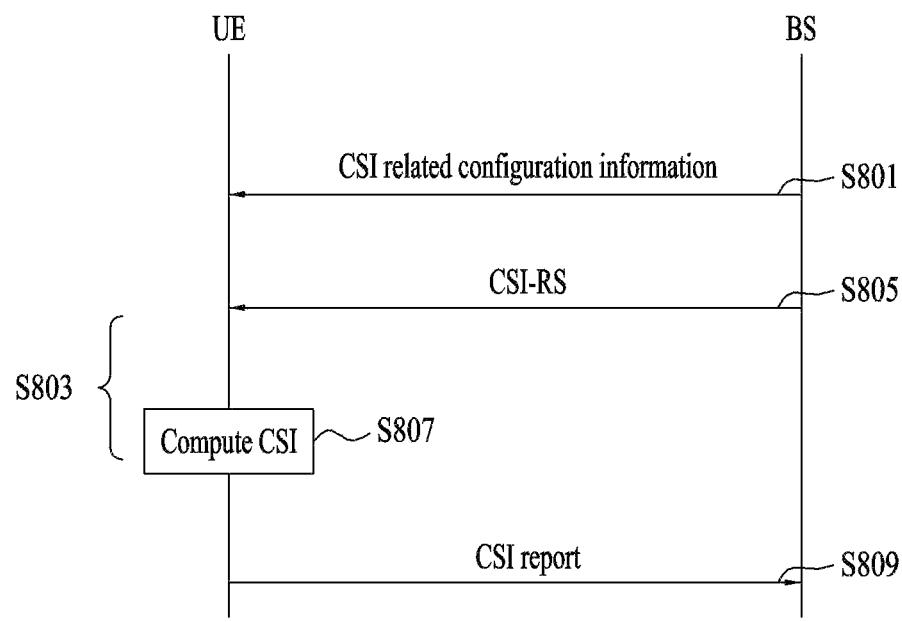
FIG. 8 is a diagram illustrating a signal flow for channel state information (CSI) reporting.

FIG. 8 is a diagram illustrating a signal flow for a CSI-related process.

For one of the above-described uses of the CSI-RS, a UE receives CSI-related configuration information from a BS by RRC signaling (S801).

The CSI-related configuration information may include at least one of channel state information interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-SSB resource set. That is, the CSI resource configuration-related information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating the use of a CSI-RS (e.g., a BM-related parameter 'repetition' and a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S805). The CSI measurement may include (1) CSI-RS reception of the UE (S803) and (2) CSI computation in the received CSI-RS (S807). Mapping of the CSI-RS to REs of CSI-RS resources in the time and frequency domains is configured by an RRC parameter, CSI-RS-ResourceMapping.

The UE reports the measured CSI to the BS (S809).

1. CSI Measurement

The NR system supports more flexible and more dynamic CSI measurement and reporting. The CSI measurement may include reception of a CSI-RS and measurement of the received CSI-RS to acquire CSI.

As the time-domain behavior of CSI measurement and reporting, channel measurement (CM) and interference measurement (IM) are supported.

A CSI-IM-based IM resource (IMR) is designed in NR, similarly to a CSI-IM in LTE and configured independently of a zero power (ZP) CSI-RS resource for PDSCH rate matching.

The BS transmits an NZP CSI-RS to the UE on each port of a configured NZP CSI-RS-based IMR.

When there is no PMI and RI feedback for a channel, multiple resources are configured in a set, and the BS or network indicates a subset of NZP CSI-RS resources for channel measurement and/or interference measurement by DCI.

A resource setting and a resource setting configuration will be described in greater detail.

1.1. Resource Setting

Each CSI resource setting 'CSI-ResourceConfig' includes a configuration of S≥1 CSI resource sets (given by an RRC parameter csi-RS-ResourceSetList). S represents the number of configured CSI-RS resource sets. The configuration of S≥1 CSI resource sets includes each CSI resource set including (NZP CSI-RS or CSI-IM) CSI-RS resources, and SSB resources used for RSRP computation.

Each CSI resource setting is located in a DL BWP identified by an RRC parameter bwp-id. All CSI resource settings linked to a CSI reporting setting have the same DL BWP.

The time-domain behavior of a CSI-RS resource within the CSI-ResourceConfig IE is indicated by an RRC parameter resourceType in the CSI resource setting, and may be set to aperiodic, periodic, or semi-persistent.

One or more CSI resource settings for channel measurement and interference measurement are configured by RRC signaling. A channel measurement resource (CMR) may be an NZP CSI-RS for CSI acquisition, and an IMR may be an NZP CSI-RS for CSI-IM and IM. The CSI-IM (or ZP CSI-RS for IM) is mainly used for inter-cell measurement. The NZP CSI-RS for IM is used mainly for measurement of intra-cell interference from multiple users.

The UE may assume that CSI-RS resource(s) for channel measurement and CSI-IM/NZP CSI-RS resource(s) for interference measurement configured for one CSI report are resource-wise quasi co-located (QCLed) with respect to 'QCL-TypeD'.

1.2. Resource Setting Configuration

A resource setting may mean a resource set list, and one reporting setting may be linked to up to three resource settings.

When one resource setting is configured, the resource setting (given by an RRC parameter resourcesForChannelMeasurement) is for channel measurement for RSRP computation.

When two resource settings are configured, the first resource setting (given by the RRC parameter resourcesForChannelMeasurement) is for channel measurement and the second resource setting (given by csi-IM-ResourcesForInterference or nzp-CSI-RS-ResourcesForInterference) is for interference measurement on the CSI-IM or on the NZP CSI-RS.

When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS-based interference measurement.

When one resource setting (given by resourcesForChannelMeasurement) is configured, the resource setting is for channel measurement for RSRP computation.

When two resource settings are configured, the first resource setting (given by resourcesForChannelMeasurement) is for channel measurement and the second resource setting (given by the RRC parameter csi-IM-ResourcesForInterference) is used for interference measurement performed on the CSI-IM.

1.3. CSI Computation

If interference measurement is performed on the CSI-IM, each CSI-RS resource for channel measurement is resource-wise associated with a CSI-IM resource by the ordering of the CSI-RS resources and CSI-IM resources in a corresponding resource set. The number of CSI-RS resources for channel measurement equals to the number of CSI-IM resources.

For CSI measurement, the UE assumes the following.

Each NZP CSI-RS port configured for interference measurement corresponds to an interference transmission layer.

All interference transmission layers on NZP CSI-RS ports for interference measurement take into account energy per resource element (EPRE) ratios.

The UE assumes another interference signal on RE(s) of NZP CSI-RS resources for channel measurement, NZP CSI-RS resources for interference measurement, or CSI-IM resources for interference measurement.

2. CSI Reporting

Time and frequency resources available for the UE to report CSI are controlled by the BS.

For a CQI, a PMI, a CSI-RS resource indicator (CRI), an SSB resource indicator (SSBRI), a layer indicator (LI), an RI, and an RSRP, the UE receives RRC signaling including N≥1 CSI-ReportConfig reporting settings, M≥1 CSI-ResourceConfig resource settings, and one or two lists of trigger states (given by aperiodicTriggerStateList and semi-PersistentOnPUSCH-TriggerStateList). Each trigger state in aperiodicTriggerStateList includes a list of associated CSI-ReportConfigs indicating resource set IDs for a channel and optionally for interference. Each trigger state in semiPersistentOnPUSCH-TriggerStateList contains one associated CSI-ReportConfig.

That is, the UE transmits a CSI report indicated by CSI-ReportConfigs associated with a corresponding CSI-RS resource setting to the BS. For example, the UE may report at least one of a CQI, a PMI, a CRI, an SSBRI, an LI, an RI, or an RSRP as indicated by CSI-ReportConfigs associated with the CSI resource setting. However, if CSI-ReportConfigs associated with the CSI resource setting indicates 'none', the UE may not report CSI or an RSRP associated with the CSI resource setting. The CSI resource setting may indicate resources for an SS/PBCH block.

Positioning Reference Signal (PRS) in LTE System

Positioning may refer to determining the geographical position and/or velocity of the UE based on measurement of radio signals. Location information may be requested by and reported to a client (e.g., an application) associated with the UE. The location information may also be requested by a client within or connected to a core network. The location information may be reported in standard formats such as cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE. For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as symbols of subframe #0. If only the MBSFN subframe is configured as the positioning subframe within a cell, OFDM symbols configured for the PRS in the MBSFN subframe may have an extended CP.

The sequence of the PRS may be defined by [Equation 1] below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, 2N_{RB}^{max,DL} - 1$$

where $n_s$ denotes a slot number in a radio frame and l denotes an OFDM symbol number in a slot. $N_{RB}^{max,DL}$ is represented as an integer multiple of $N_{SC}^{RB}$ as the largest value among DL bandwidth configurations. $N_{SC}^{RB}$ denotes the size of a resource block (RB) in the frequency domain, for example, 12 subcarriers.

c(i) denotes a pseudo-random sequence and may be initialized by [Equation 2] below.

$$c_{int} = n^{28} \cdot \lfloor N_{ID}^{PRS}/512 \rfloor + 2^{10} \cdot (7 \cdot) n_s + 1) + l + 1) \cdot (2 \cdot (N_{ID}^{PRS} \mod 512) + 1) + 2 \cdot) N_{ID}^{PRS} \mod 512) + N_{CP} \quad \text{[Equation 2]}$$

Unless additionally configured by higher layers, $N_{ID}^{PRS}$ is equal to $N_{ID}^{cell}$, and $N_{CP}$ is 1 for a normal CP and 0 for an extended CP.

FIG. 9 illustrates an exemplary pattern to which a PRS is mapped in a subframe. As illustrated in FIG. 9, the PRS may be transmitted through an antenna port 6. FIG. 9(a) illustrates mapping of the PRS in the normal CP and FIG. 9(b) illustrates mapping of the PRS in the extended CP.

The PRS may be transmitted in consecutive subframes grouped for positioning. The subframes grouped for positioning are referred to as a positioning occasion. The positioning occasion may consist of 1, 2, 4 or 6 subframes. The positioning occasion may occur periodically at a periodicity of 160, 320, 640 or 1280 subframes. A cell-specific subframe offset value may be defined to indicate the starting subframe of PRS transmission. The offset value and the periodicity of the positioning occasion for PRS transmission may be derived from PRS configuration indexes as listed in [Table 3] below.

TABLE 3

| PRS configuration Index ($I_{PRS}$) | PRS periodicity (subframes) | PRS subframe offset (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed to have a low-interference subframe so that no data is transmitted in the positioning subframe. Therefore, the PRS is not subjected to interference due to data transmission although the PRS may interfere with PRSs of other cells.

UE Positioning Architecture in LTE System

Figure 10:
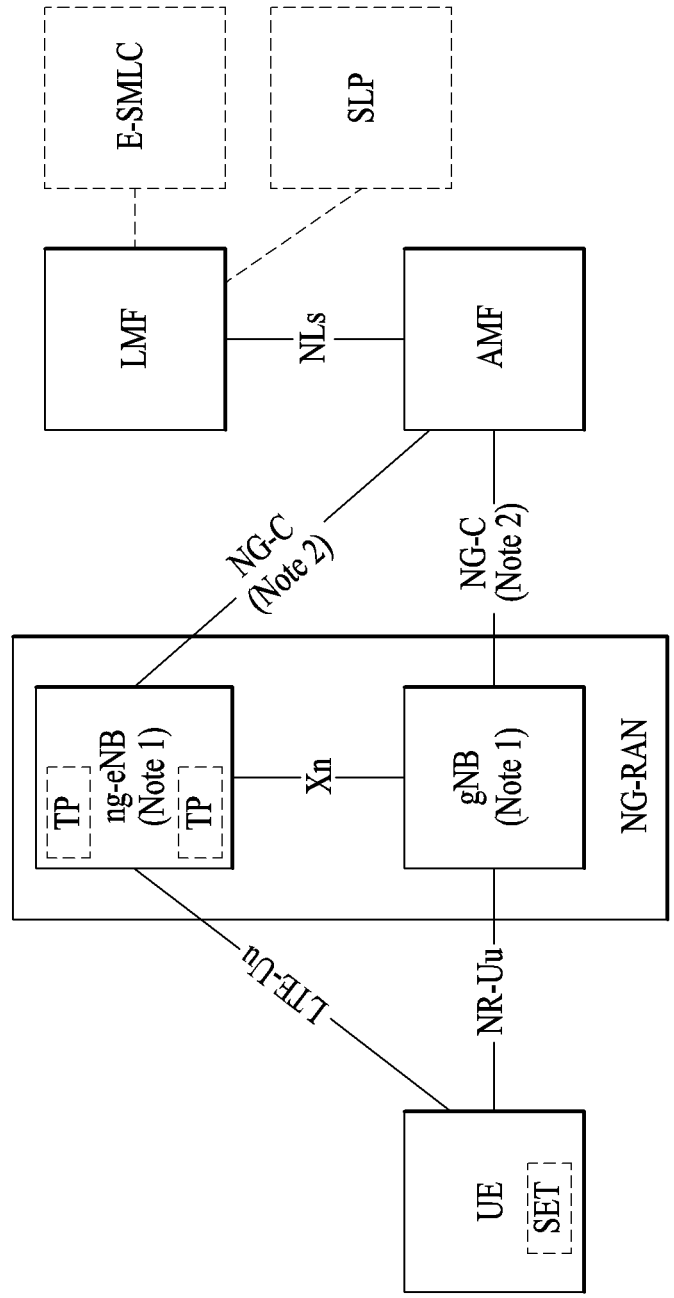
FIGS. 10 and 11 are diagrams illustrating the architecture of a system for measuring the position of a UE and a procedure of measuring the position of the UE.

FIG. 10 illustrates the architecture of a 5G system applicable to positioning of a UE connected to a next generation-radio access network (NG-RAN) or an E-UTRAN.

Referring to FIG. 10, a core access and mobility management function (AMF) may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support an observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain positioning for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein.

The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

Figure 11:
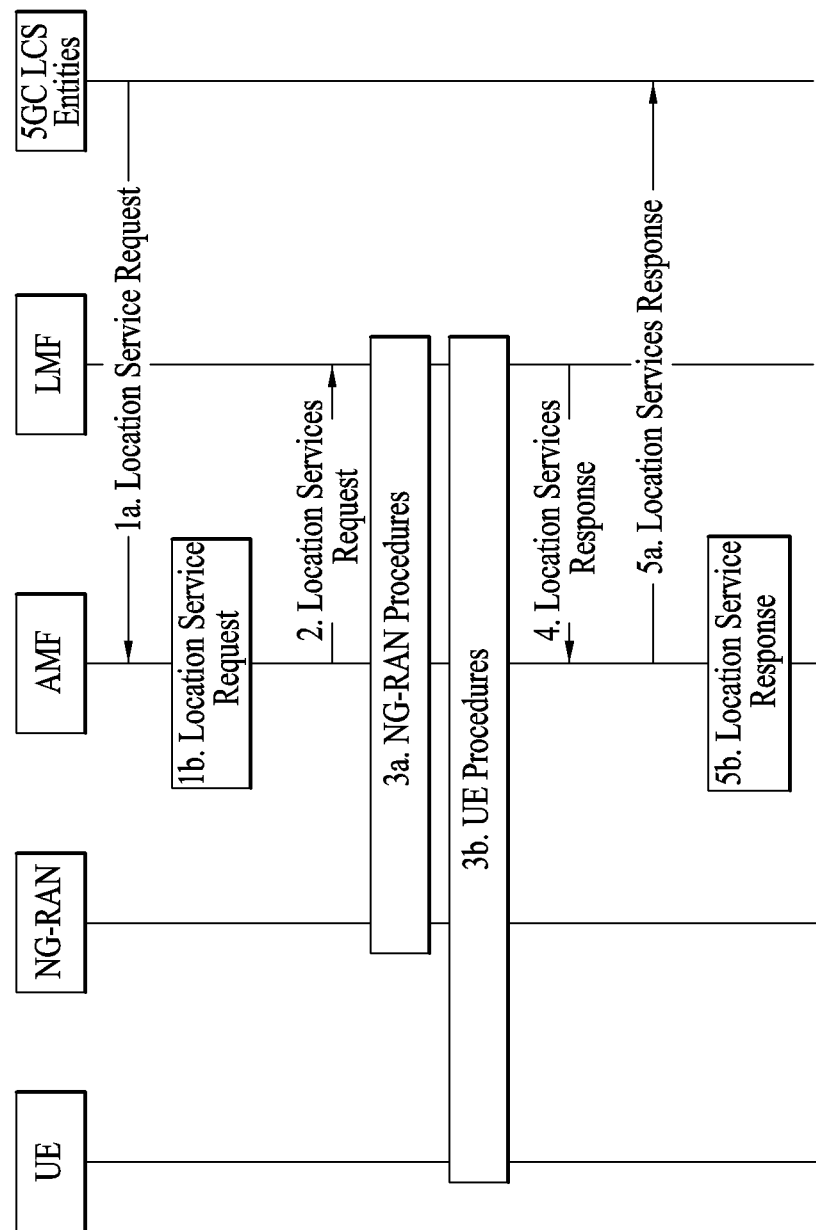

FIG. 11 illustrates an implementation example of a network for UE positioning. When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 11. In other words, in FIG. 11, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 11. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3*b*, when information or requests exchanged between the LMF and the UE are erroneous, an error message may be transmitted and received and an abort message for aborting positioning may be transmitted and received.

Protocol used in step 3*b* may be an LPP protocol which will be described later.

Step 3*b* may be performed additionally after step 3*a* but may be performed instead of step 3*a*.

In step 4, the LMF may provide a location service response to the AMF. The location service response may include information as to whether UE positioning is successful and include a location estimate value of the UE. If the procedure of FIG. 8 has been initiated by step 1*a*, the AMF may transfer the location service response to a 5GC entity such as a GMLC. If the procedure of FIG. 8 has been initiated by step 1*b*, the AMF may use the location service response in order to provide a location service related to an emergency call.

Protocol for Location Measurement (1) LTE Positioning Protocol (LPP)

Figure 12:
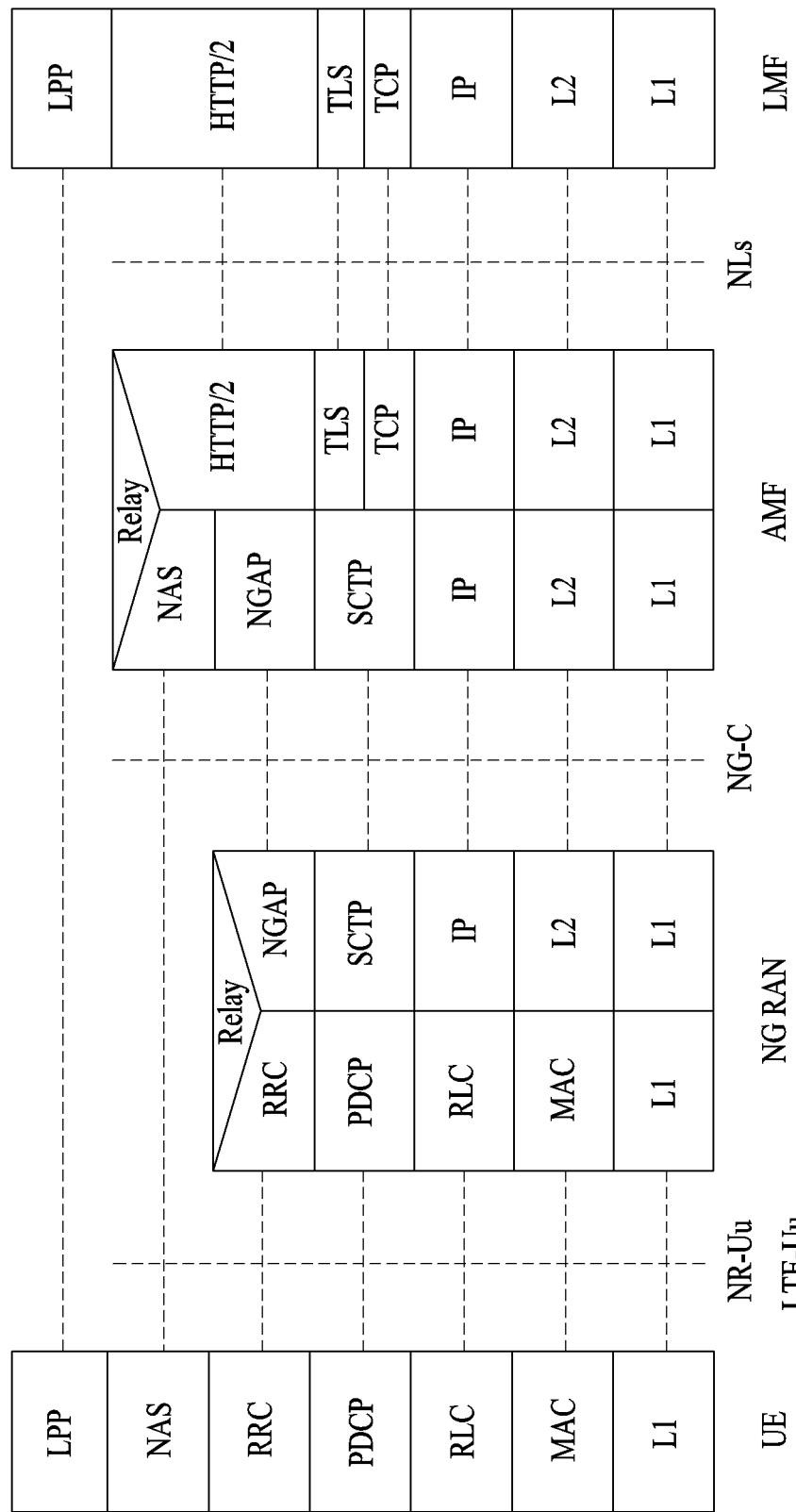
FIG. 12 illustrates an exemplary protocol layer used to support LTE positioning protocol (LPP) message transfer.
Figure 13:
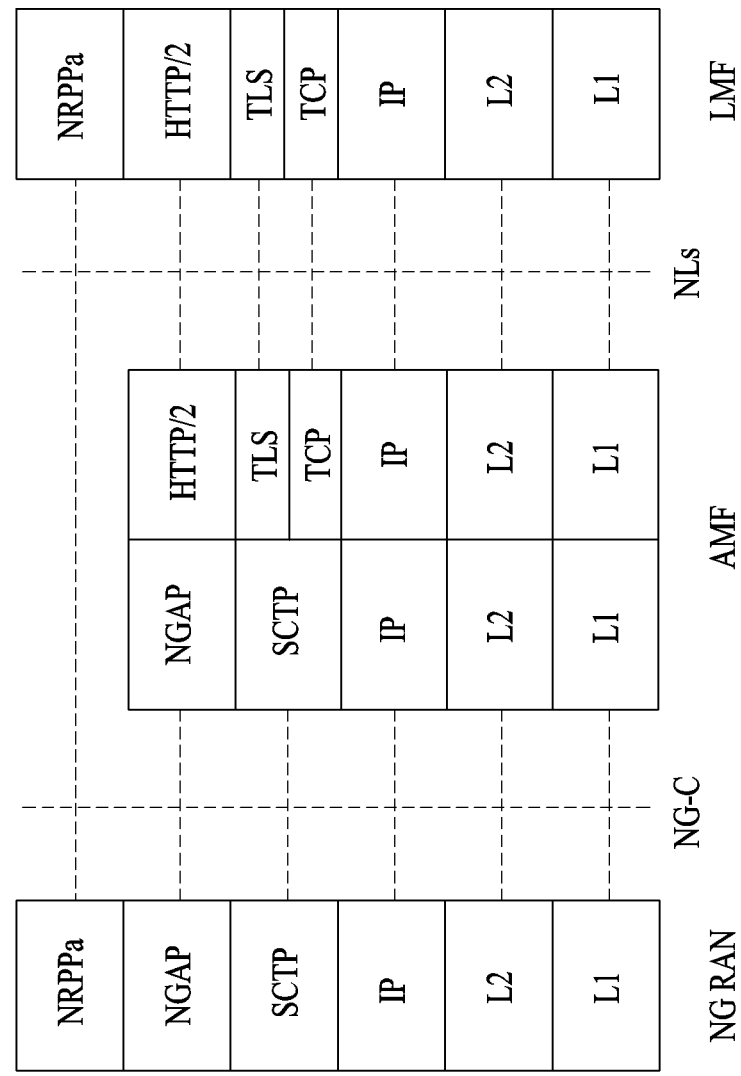
FIG. 13 is a diagram illustrating an exemplary protocol layer used to support NR positioning protocol A (NRPPa) protocol data unit (PDU) transfer.

FIG. 12 illustrates an exemplary protocol layer used to support LPP message transfer between an LMF and a UE. An LPP protocol data unit (PDU) may be carried in a NAS PDU between an MAF and the UE. Referring to FIG. 9, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate stopping of an LPP procedure, through an LPP message.

(2) NR Positioning Protocol a (NRPPa)

FIG. 10 illustrates an exemplary protocol layer used to support NRPPa PDU transfer between an LMF and an NG-RAN node. NRPPa may be used to carry information between an NG-RAN node and an LMF. Specifically, NRPPa may exchange an E-CID for measurement transferred from an ng-eNB to an LMF, data for support of an OTDOA positioning method, and a cell-ID and a cell position ID for an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transmitting information about a particular UE (e.g., location measurement information) and the second type is a non-UE-associated procedure for transmitting information applicable to an NG-RAN node and associated TPs (e.g., timing information of the gNB/ng-eNG/TP). The two types may be supported independently or simultaneously.

Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

(1) Observed Time Difference of Arrival (OTDOA)

Figure 14:
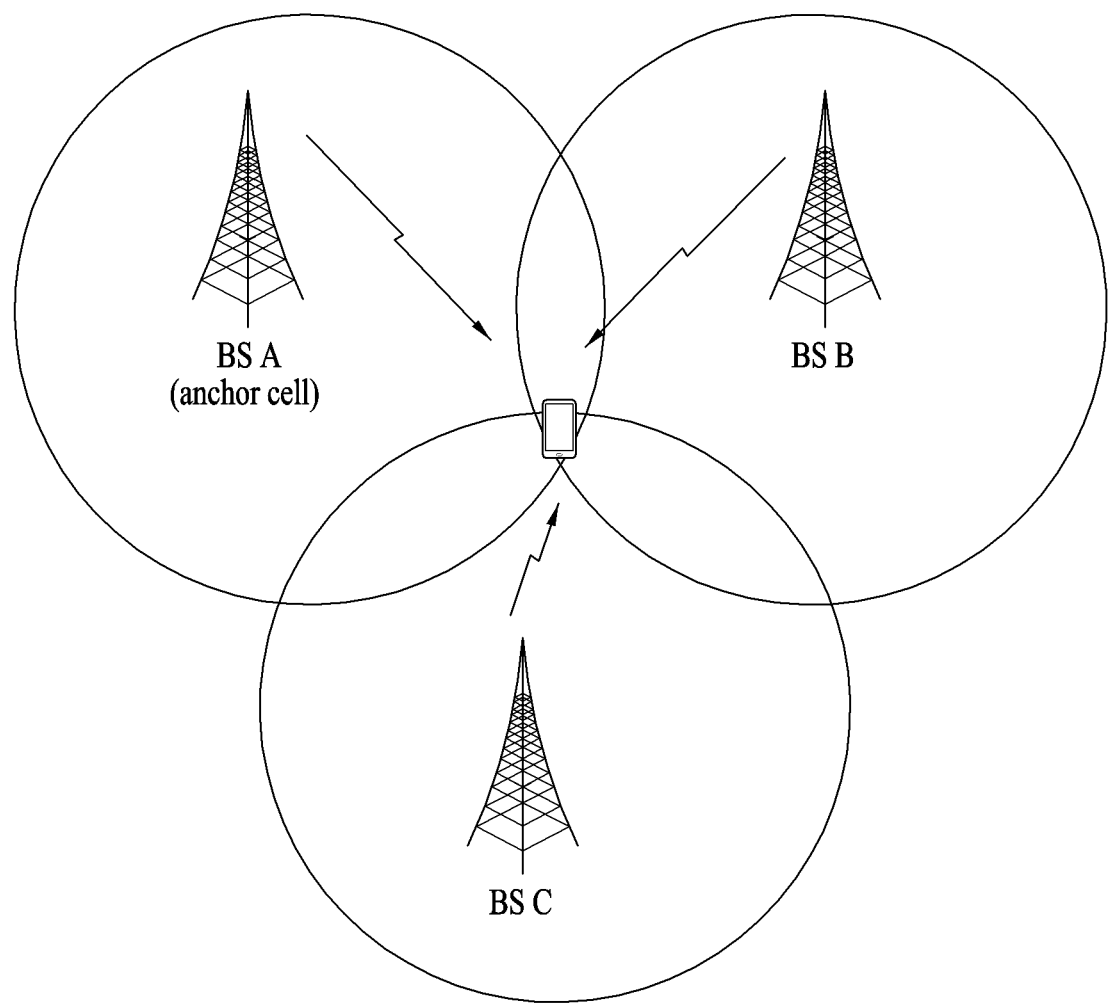
FIG. 14 is a diagram illustrating an embodiment of an observed time difference of arrival (OTDOA) positioning method.

FIG. 14 is a diagram illustrating an OTDOA positioning method. The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure times of arrival (ToAs) of signals received from geographically distributed three or more TPs or BSs. For example, ToAs for TP 1, TP 2, and TP 3 may be measured, and an RSTD for TP 1 and TP 2, an RSTD for TP 2 and TP 3, and an RSTD for TP 3 and TP 1 are calculated based on the three ToAs. A geometric hyperbola may be determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, an RSTD for two TPs may be calculated based on [Equation 3] below.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (Ti - T1) + (ni - n1)$$ [Equation 3]

where c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance ($T_{ADV}$), and/or AoA Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

(3) Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

If one PRS (e.g., PRS ID) is allocated to a specific TP/BS in the NR system supporting multiple narrow transmission beams (TX beams), it may be difficult for a UE to identify PRSs transmitted on different TX beams. If PRSs have different bandwidth configurations, the computation complexity of the UE may be reduced even though the PRSs are transmitted on the same TX beam. Based on the above situation, PRS resource and PRS resource set configurations will be described hereinbelow.

FIGS. 15 to 18 are diagrams illustrating implementation examples of operations of a UE, a BS, a location server, and a network according to embodiments of the present disclosure.

Figure 15:
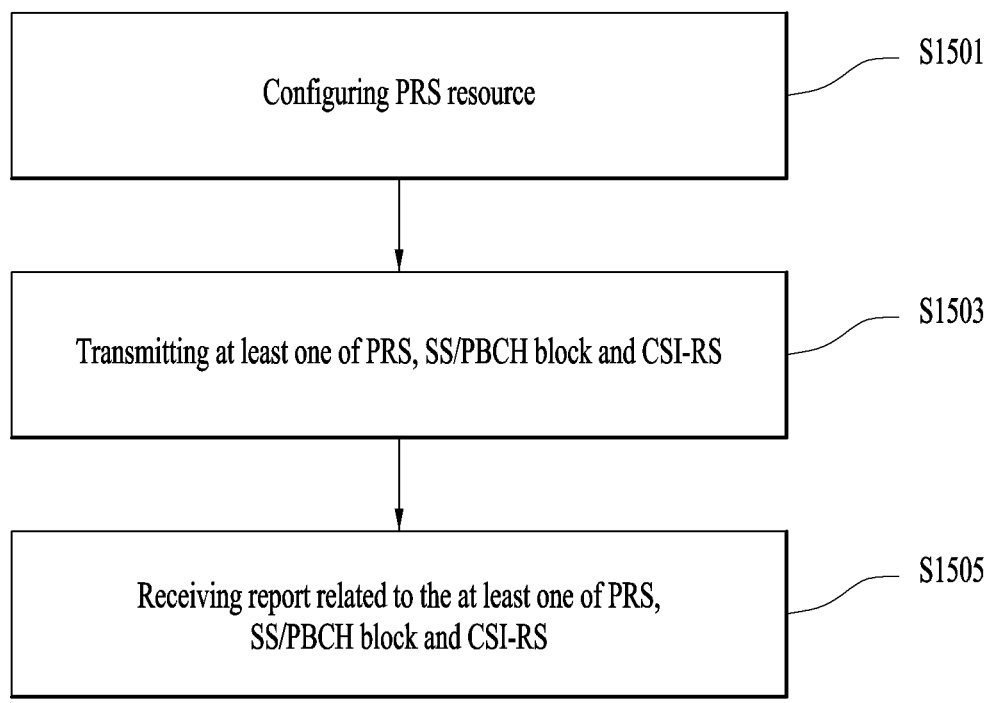
FIGS. 15 to 18 are diagrams illustrating implementation examples of operations of a UE, a base station, a location server, and a network according to embodiments of the present disclosure.

The overall operations of the BS will be described with reference to FIG. 15. Referring to FIG. 15, the BS may configure PRS resources (S1501). In this case, the BS may receive information about a PRS resource configuration from the location server. How the PRS resources are configured will be described in the following embodiments. The BS may transmit at least one of a PRS, an SS/PBCH block, and a CSI-RS to the UE (S1503). The BS may receive a report on the at least one of the PRS, SS/PBCH block, and CSI-RS (S1505). Information included in the report and methods for the UE to transmit the report will be described in the following embodiments. Before step S1501, the BS may transmit to the location server information indicating that the SS/PBCH block and/or CSI-RS is used as a PRS resource or information indicating that the SS/PBCH block and/or CSI-RS is transmitted to determine a TX/RX beam for transmitting and receiving the PRS resource.

Figure 16:
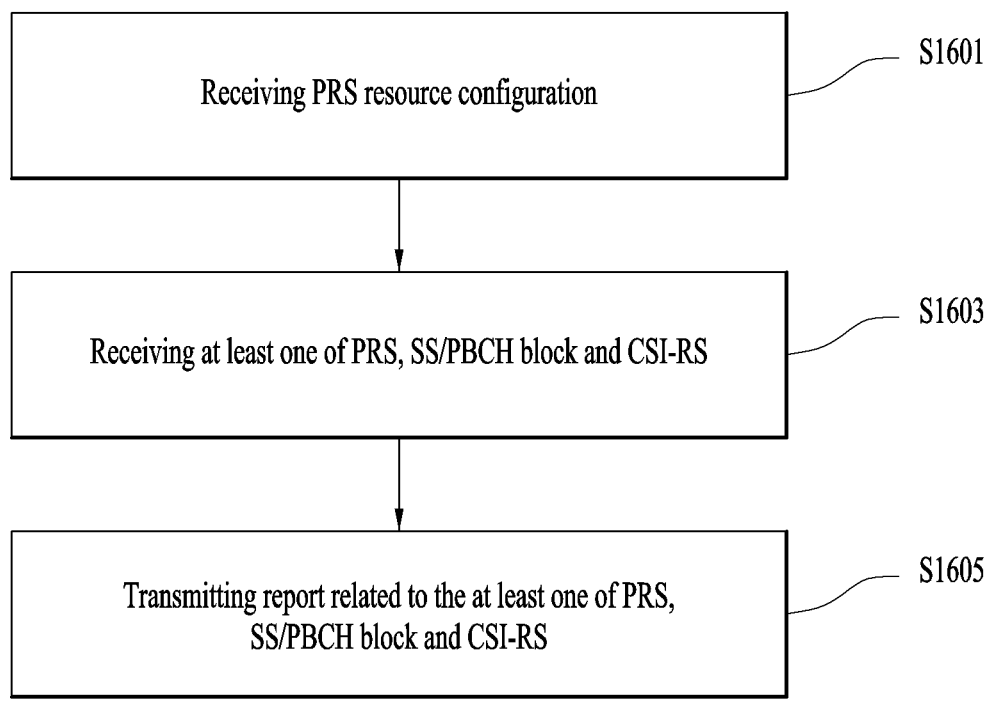

The overall operations of the UE will be described with reference to FIG. 16. Referring to FIG. 16, the UE may receive information about a PRS resource configuration from the BS or location server (S1601). Details of the information about the PRS resource configuration will be described in the following embodiments.

The UE may receive at least one of a PRS, SS/PBCH block, and CSI-RS from the BS (S1603) and transmit a report on the at least one of the PRS, SS/PBCH block, and CSI-RS (S1605). Information included in the report and methods for the UE to transmit the report will be described in the following embodiments.

Figure 17:
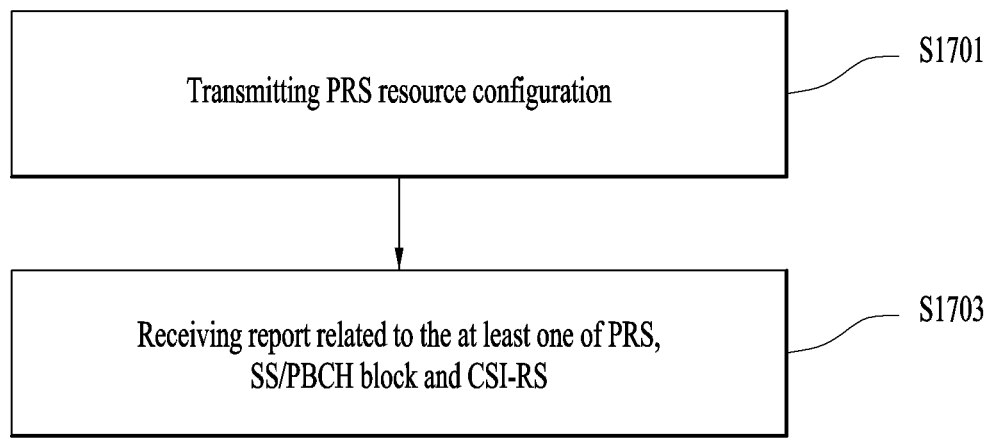

FIG. 17 shows the overall operations of the location server. Referring to FIG. 17, the location server may transmit PRS resource configuration information to the BS and/or UE (S1701). In this case, PRS resources may be configured according to the following embodiments. The location server may receive a report on at least one of a PRS, SS/PBCH block, and CSI-RS from the UE or BS (S1703). Information included in the report and methods for the UE or BS to transmit the report will be described in the following embodiments. Before step S1701, the location server may receive from the BS information indicating that the SS/PBCH block and/or CSI-RS is used as a PRS resource or information indicating that the SS/PBCH block and/or CSI-RS is transmitted to determine a TX/RX beam for transmitting and receiving the PRS resource.

The overall operations of the network will be described with reference to FIG. 18.

Figure 18:
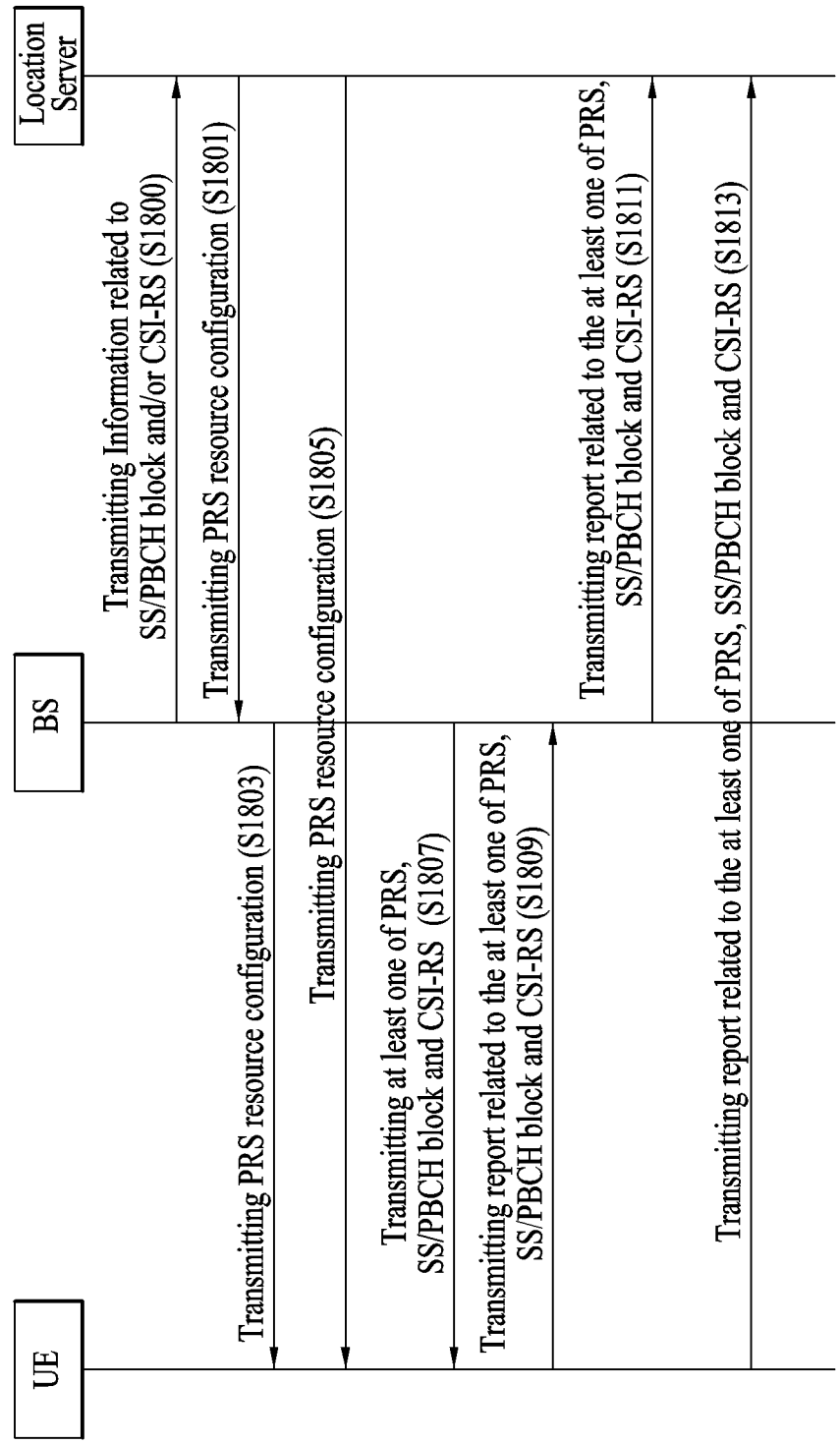

Referring to FIG. 18, the BS may transmit to the location server information indicating that an SS/PBCH block and/or CSI-RS is used as a PRS resource or information indicating that the SS/PBCH block and/or CSI-RS is transmitted to determine a TX/RX beam for transmitting and receiving the PRS resource (S1800). The location server may transmit PRS resource configuration information to the BS and/or UE, and the BS may forward the PRS resource configuration information to the UE (S1801 to S1805). If the location server transmits the PRS resource configuration information to both the BS and UE, the BS may not perform step S1803. That is, when the location server transmits the PRS resource configuration information to both the BS and UE, the BS may not forward the PRS resource configuration information to the UE. However, if the location server transmits the PRS resource configuration information to only the BS, the BS may forward the PRS resource configuration information to the UE. In other words, if step S1805 is dropped, step S1803 may be mandatory. That is, steps S1803 and S1805 may be selective. Details of the PRS resource configuration information will be described in the following embodiments.

The BS may transmit at least one of a PRS, SS/PBCH block, and CSI-RS to the UE (S1807). The UE may transmit a report on the at least one of the PRS, SS/PBCH block, and CSI-RS to the BS and/or location server, and the BS may forward the report on the at least one of the PRS, SS/PBCH block, and CSI-RS to the location server (S1809 to S1813). If the UE transmits the report directly to the location server, step S1811 may be dropped. That is, the BS may not forward the report to the location server. However, if the UE transmits the report only to the BS, the BS may need to forward the report to the location server. In other words, if step S1813 is dropped, step S1813 may be mandatory. That is, steps S1811 and S1813 may be selective. Information included in the report and transmission methods therefor will be described in the following embodiments.

To configure a specific PRS for the UE, a PRS unit/resource and/or a PRS resource group/set may be defined as a PRS configuration unit, which is similar to a PRS configuration parameter "PRS-Info" in 3GPP TS36.355. In such a PRS configuration, each PRS resource may include, for example, a PRS resource ID, an occupied bandwidth, a periodicity, the number of consecutive slots for PRS transmission, etc. In addition, one PRS resource group/set may be defined by grouping one or more PRSs (e.g., PRS resources or PRS IDs). For example, a plurality of PRS IDs may be configured as one PRS group/set.

The UE may recognize that PRSs (e.g., PRS resources or PRS IDs) in a specific PRS resource group/set are transmitted from TPs/BSs at the same location. Alternatively, the location server or BS may configure/indicate for/to the UE that PRSs (e.g., PRS resources or PRS IDs) in a specific PRS resource group/set are transmitted from TPs/BSs at the same location. Herein, TPs/BSs at the same location may mean that the TPs/BSs are at the same geographic location. Further, TPs/BSs at the same location or at the same geographic location may mean that the TPs/BSs are the same TP/BS.

The location server or BS may configure/indicate for/to the UE that different PRSs (e.g., PRS resources or PRS IDs) in a specific PRS resource group/set are transmitted on the same TX beam. For example, the BS or location server may configure/indicate spatial QCL (e.g., QCL type D) between PRSs (e.g., PRS resources or PRS IDs) for/to the UE.

When spatial QCL is configured between different PRSs (e.g., PRS resources or PRS IDs) included in a specific PRS resource group/set, the UE may expect that the different PRSs will be transmitted from the same TP/BS on the same TX beam. In other words, the UE may expect that the different PRSs included in the specific PRS resource group/set will be transmitted by the same TP/BS and among the different PRSs, spatially QCLed PRSs (e.g., QCL type D) will be transmitted on the same TX beam. That is, while one PRS resource or one PRS ID may be associated with one TX beam, different PRSs may be transmitted on the same TX beam if the same spatial QCL is configured between the different PRSs corresponding to different PRS resources or different PRS IDs.

A PRS resource described in this document may be a parameter or unit for configuring the PRS including a PRS bandwidth, a PRS ID (PRS configuration ID), PRS muting information, the number of slots constituting a PRS occasion, a PRS occasion group length, etc. as in the PRS configuration parameter "PRS-Info" in 3GPP TS36.355.

If the PRS is configured at the resource level, it may be suitable for a narrow beam based system such as NR. In the LTE system, one PRS is configured for a reference cell such as a serving cell and a neighboring cell/TP because the LTE system is a wide beam based system. However, in NR, since a specific TP/BS performs beam sweeping on multiple beams based on narrow beams, the TP/BS is likely to transmit the PRS on a narrow TX beam instead of transmitting the PRS on a common beam. In particular, in a frequency band of 6 GHz or higher, the TP/BS is more likely to transmit the PRS on a narrow TX beam.

From the perspective of the UE that receives multiple PRSs transmitted on different TX beams, the UE may need to identify each of the PRSs transmitted on the different TX beams because measurements such as time of arrival (ToA), reference signal time difference (RSTD), reference signal received power (RSRP), signal-to-noise ratio (SNR), and so on may be different.

To this end, different PRSs may be transmitted on different PRS resources for each TX beam so that the UE may recognize that PRSs transmitted on different PRS resources are transmitted on different TX beams. For example, while different PRS resources may share time and/or frequency RE resources, the PRS IDs and/or PRS sequences thereof are configured different at least, whereby the UE may identify these PRS resources. In other words, a PRS resource may include not only a time and/or frequency resources but also a PRS ID and a PRS sequence. Therefore, different PRS resources may mean that at least one of PRS time resources, frequency resource, PRS IDs, and PRS sequences is different.

Hereinbelow, PRS configuration/indication methods performed by the BS and/or location server to improve the performance of positioning for a low-end UE capable of using only a narrowband PRS and efficiently estimate the position of the UE will be described.

Both a narrowband such as 5 MHz and a wideband may be supported for NR positioning in the NR system. To apply OTDOA, the NR system may need to be capable of supporting various types of UEs and enhanced positioning performance, regardless of UE performance. For example, the following three types of UEs may be considered to apply the OTDOA to the NR system.

Type A: a Type A UE may perform wideband PRS processing without any limitations.

Type B: a Type B UE may have several hardware limitations in processing capability and/or battery life and perform wideband PRS processing.

Type C: a Type C UE may have several hardware limitations in processing capability and/or battery life and perform narrowband PRS processing only.

For Type A UEs, it may not be difficult to provide high positioning accuracy by using many RSTD measurements with high sampling rate based OTDOA. However, for Type B or Type C UEs, a method capable of improving the accuracy of positioning by overcoming the hardware limitations may be required.

For OTDOA operation in the NR system, the TP/BS may transmit a wideband PRS, and the Type C UE may receive only a limited part of the wideband PRS. To improve the accuracy of positioning for the Type C UE, a high PRS RE density may be configured in RBs corresponding to a frequency bandwidth that the Type C UE can access, as shown in FIG. 19 (a).

For the Type B UE, since more frequency bandwidths may be additionally used to improve the positioning accuracy, accurate positioning performance may be expected compared to the type C UE. However, in supporting wideband PRS based OTDOA for the Type B UE, a lot of studies may be required to provide high-level positioning accuracy because the Type B UE has the hardware limitations unlike the Type A UE. As one method, it may be considered that both low and high sampling rates are commonly applied to the OTDOA.

For example, PRS measurements obtained at the low sampling rate may be employed as prerequisite information useful to both a target UE and the BS/location server to reduce the computation complexity and improve the RSTD measurement accuracy before the high sampling rate based OTDOA operation. The low and high sampling rate based OTDOA may be supported in terms of UE implementation, or it may be explicitly indicated by a BS configuration such as narrowband and wideband PRSs for assisting flexible NR bandwidth configurations such as various BWPs.

When configuring the PRS or PRS resource, the location server and/or BS may configure/indicate different PRS RE densities depending on time and/or frequency resources. For example, when configuring a specific PRS or PRS resource for the UE, the BS and/or location server may configure a high or low frequency-domain PRS RE density for a specific bandwidth or specific RBs. That is, when configuring a specific PRS and/or PRS resource, the BS and/or location server may configure/indicate one or more PRS RE densities. In addition, the BS and/or location server may configure/indicate a bandwidth or RBs where the one or more PRS RE densities are configured in the form of a bitmap.

For example, a high PRS RE density may be configured/allocated only in a frequency bandwidth available to the Type C UE capable of using only the narrowband PRS to improve the performance positioning of the Type C UE.

Alternatively, when configuring the PRS and/or PRS resource for the UE, the BS and/or location server may configure/indicate the number of times that the PRS is repeated differently depending on the PRS frequency bandwidth and/or PRS RBs. That is, a different time-domain PRS density may be configured only for a specific PRS bandwidth and/or RBs within the PRS transmission bandwidth. For example, as shown in FIG. 19 (b), the number of PRS repetitions in a region named "high PRS RE density" may be greater than the number of PRS repetitions in a region named "low PRS RE density".

As another example, if one PRS occasion consists of four slots, the PRS may be transmitted in the four slots in the "high PRS RE density" region, but the PRS may be transmitted in some of the four slots in the "low PRS RE density" region.

To perform the OTDOA, a process for achieving beam correspondence between the target UE and BS/TP is required. To this end, a beam management process of the NR system may be employed, or an independent beam management process may be introduced for the OTDOA.

To find a beam pair between the UE and BS/TP for OTDOA-based positioning, the BS or location server may instruct the UE to find a beam pair with the shortest ToA, instead of finding a beam between the UE and BS having the maximum RSRP. In this case, the ToA may be determined by the location of a first peak for received signals as shown in FIG. 20 (a). That is, the ToA may be determined based on the location of the first peak A among signals A to H received on multiple beams, and the beam pair may be found based on the location of the first peak.

However, if the RSRP of the first peak is extremely small or the noise level is considerably greater than the signal level, it may be difficult to perform smooth communication through the beam pair corresponding to the first peak. Thus, if the RSRP is less than or equal to a specific threshold as shown in FIG. 20 (b), the ToA may be determined based on a second peak B, and the beam pair may be found based on the second peak. When reporting information about a beam related to corresponding ToA to the BS and/or location server, the UE may also report information about the received strength of the corresponding beam such as RSRP, etc.

Hereinafter, a description will be given of a method of finding a beam pair based on the beam management process of the current NR system. For example, a CSI-RS for L1-RSRP measurement, i.e., a CSI-RS for beam management may be used. The BS and/or location server may instruct the UE to report the index of a CSI-RS resource having the minimum ToA among CSI-RS resources included in a specific CSI-RS resource set where a higher layer parameter "repetition" is ON or OFF and/or the corresponding ToA. For example, such an instruction may be indicated/configured through a report setting.

Specifically, the BS and/or location server may allocate three CSI-RS resource sets where the higher layer parameter "repetition" is OFF to three TPs, respectively. Each CSI-RS resource set may include a plurality of CSI-RS resources.

The TP may transmit CSI-RS resources on TX beams with different directions. The UE may measure the ToA for each CSI-RS resource and select and report a CRI related to the shortest ToA for each CSI-RS resource set. The TP may transmit the PRS by using a TX beam corresponding to the reported CRI as a reference beam.

The UE may select a reference beam for PRS beams of a neighboring BS/TP by using CSI-RSs and/or SS PBCH blocks for L3-RSRP measurement and report the reference beam to the BS. That is, the UE may perform ToA measurement for SS/PBCH blocks transmitted from a BS/TP in a neighboring cell, select the index of an SS/PBCH block with the shortest ToA, and then report the SS/PBCH block index to the BS so that the neighboring cell may use it as a reference beam for determining PRS TX beams.

Hereinafter, the independent beam management process for the OTDOA will be described. The PRS may be used to achieve TX/RX beam correspondence between the neighboring BS/TP and target UE. The BS and/or location server may configure/indicate for/to the UE that several PRS occasions, specific slots for PRS transmission, or several PRS transmission periods are used to find TX/RX beams. Such a PRS for finding a TX/RX beam may be configured/indicated separately from a PRS configured/indicated for RSTD measurement. Further, the time and/or frequency domain PRS RE density of the former may be lower than that of the latter.

Figure 21:
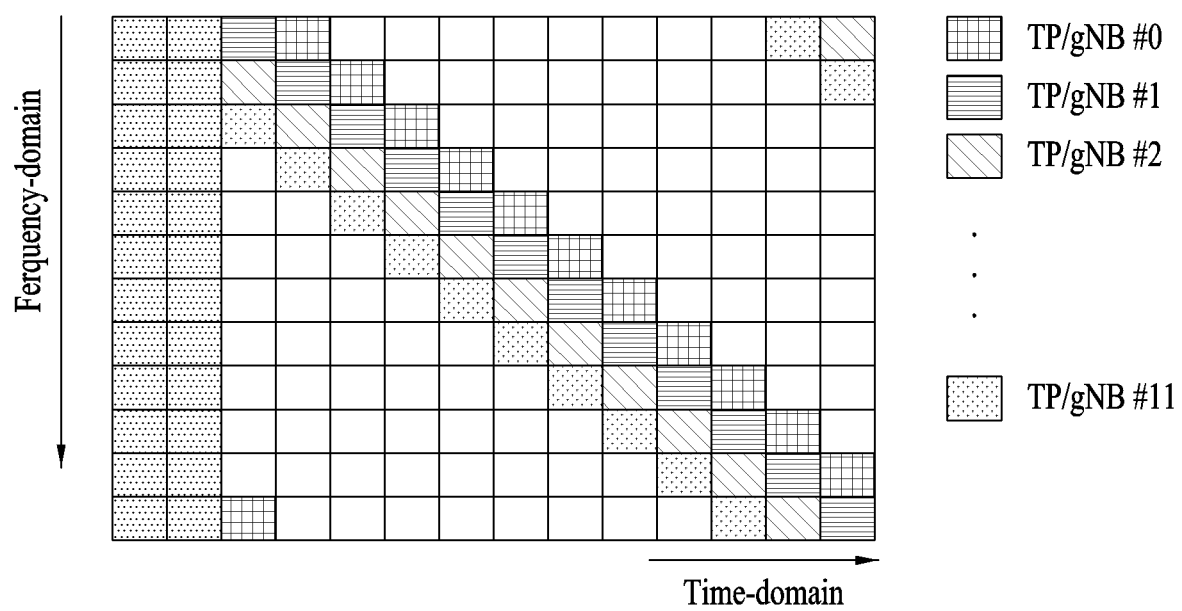
FIG. 21 illustrates an embodiment of allocating PRSs within a slot according to the present disclosure.

For example, assuming that each of the 12 TPs/BSs are allowed to perform TX beam sweeping on 10 TX beams as shown in FIG. 21, each TP/BS may be allocated a PRS resource set/group, and 10 PRS resources may be configured/allocated for each PRS resource set/group. Each TP/BS may transmit a PRS resource corresponding to each TP/BS while performing the TX beam sweeping during 10 symbols.

In other words, each of the 12 TPs/BSs may use one RE in each symbol in one RB, except the first two symbols related to a control channel region and thus transmit the PRS on a different PRS resource in each symbol.

The UE may be configured/instructed to report the index of a PRS resource with the shortest TOA in the PRS resource set/group transmitted from each TP/BS to the BS and/or location server. It may be configured/indicated for the UE that the RE density of a PRS transmitted after a PRS occasion and/or PRS slots for TX/RX beam sweeping is more than or equal to 2. The UE may recognize that a specific TP/BS transmits the PRS resource on the same TX beam except the PRS occasion and/or PRS slots configure/indicated for the TX/RX beam sweeping and form an RX beam suitable for pairing with the same TX beam. Alternatively, the BS and/or location server may instruct the UE to form an RX beam suitable for reception of a specific PRS resource.

If an RE pattern for PRS transmission is designed/defined/configured in relation to a PDCCH transmission symbol for each TP/BS or for a specific TP/BS group, it is possible to mitigate an interference problem caused when the same time-frequency resources are used by PRSs transmitted from TPs/BSs. For example, it is assumed that a total of 12 TPs/BSs are divided into two groups, each including 6 TPs/BS. In the first group, the PDCCH may be transmitted in the first and second symbols, and in the second group, the PDCCH may be transmitted the third and fourth symbols, thereby avoiding the occurrence of interference in the first four symbols in the two groups at all times.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 22:
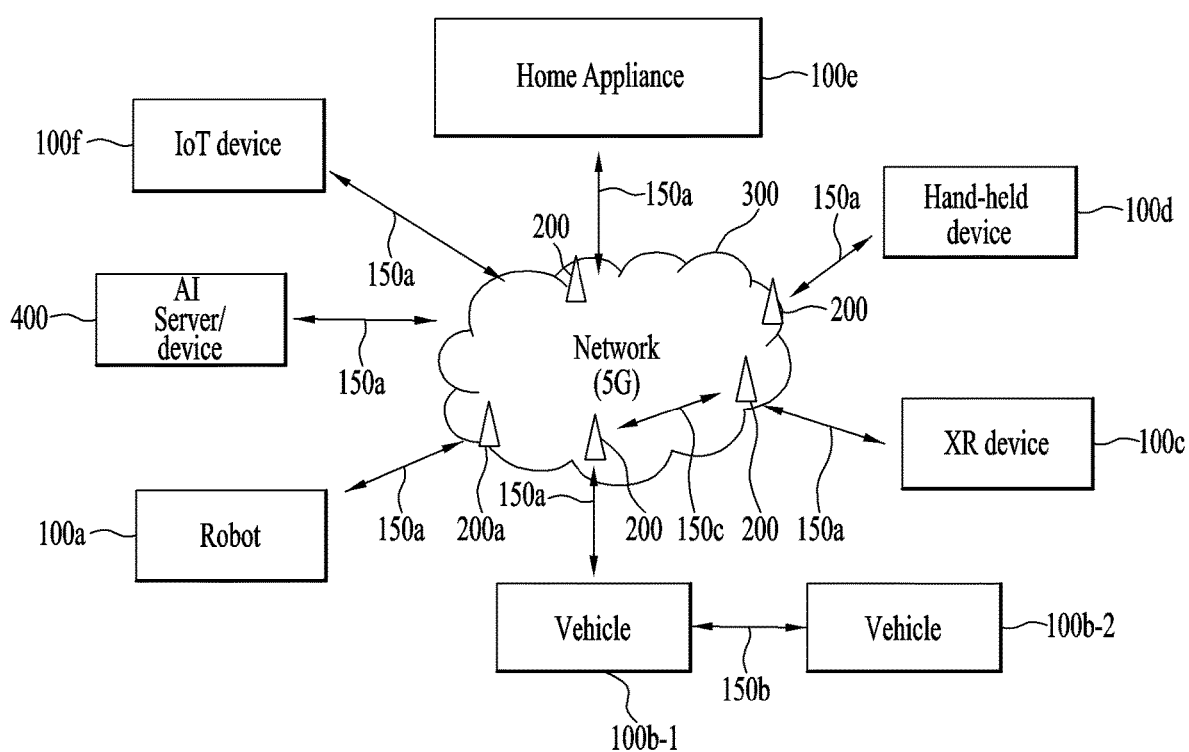
FIG. 22 illustrates an example of a communication system to which embodiments of the present disclosure are applied.

FIG. 22 illustrates a communication system 1 applied to the present disclosure.

Referring to FIG. 22, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 23:
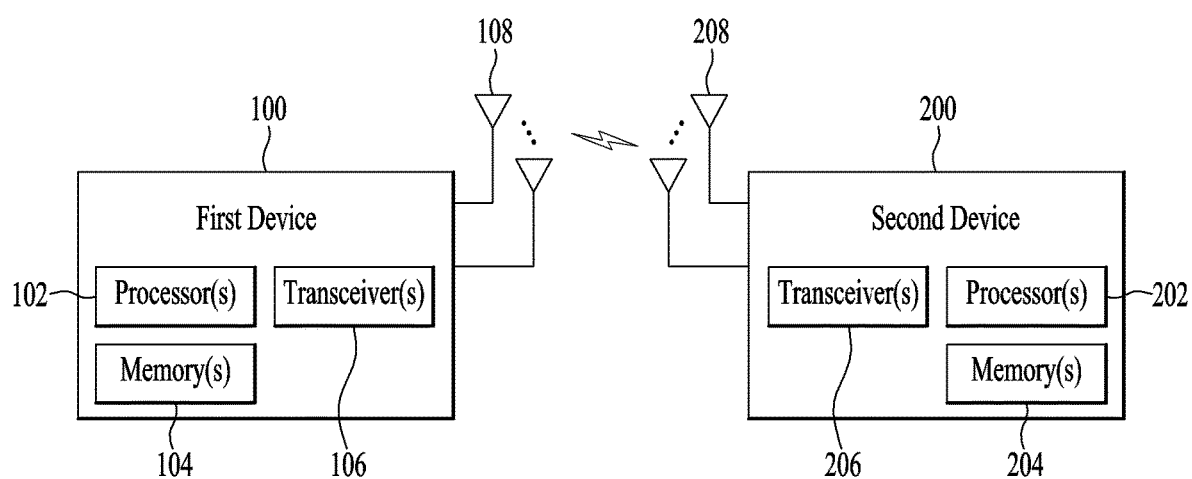
FIGS. 23 to 26 illustrate examples of various wireless devices to which embodiments of the present disclosure are applied.

FIG. 23 illustrates wireless devices applicable to the present disclosure.

Referring to FIG. 23, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Hereinafter, a description will be given of instructions and/or operations controlled by the processor(s) 102 and stored in the memory(s) 104 of the first wireless device 100 according to an embodiment of the present disclosure.

While the following operations are described in the context of control operations of the processor(s) 102 from the perspective of the processor(s) 102, software code for performing the operations may be stored in the memory(s) 104.

Figure 27:
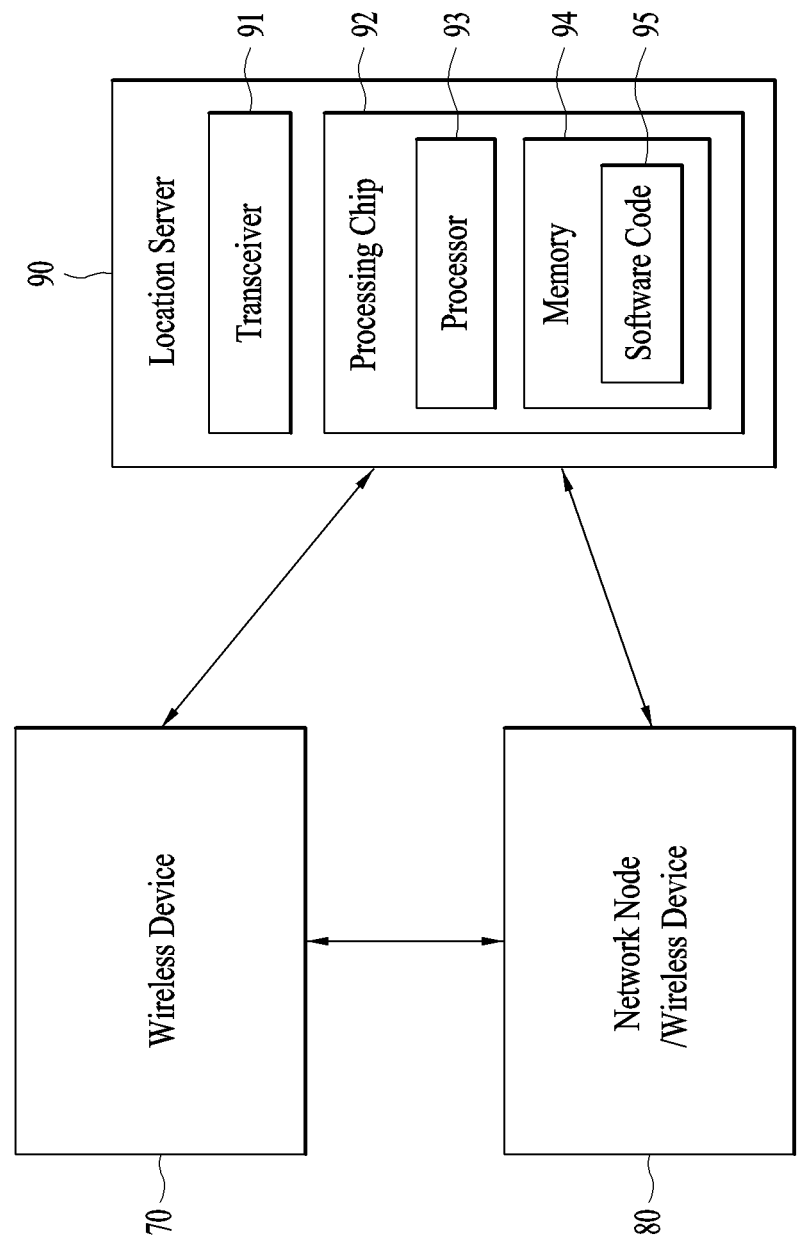
FIG. 27 illustrates an exemplary location server to which embodiments of the present disclosure are applied.

The processor(s) 102 may control the transceiver(s) 106 to receive information about a PRS resource configuration from the second wireless device 200 or a location server 90 of FIG. 27. In this case, the information about the PRS resource configuration may be configured according to the above-described embodiments.

The processor(s) 102 may control the transceiver(s) 106 to receive at least one of a PRS, SS/PBCH block, and CSI-RS from the second wireless device 200 and also control the transceiver(s) 106 to transmit a report on the at least one of the PRS, SS/PBCH block, and CSI-RS. In this case, information included in the report may be configured according to the above-described embodiments, and the processor(s) 102 may control the transceiver(s) 106 to transmit the report cording to the above-described embodiments.

Hereinafter, a description will be given of instructions and/or operations controlled by processor(s) 202 and stored in memory(s) 204 of the second wireless device 200 according to an embodiment of the present disclosure.

While the following operations are described in the context of control operations of the processor(s) 202 from the perspective of the processor(s) 202, software code for performing the operations may be stored in the memory(s) 204. The processor(s) 202 may control transceiver(s) 206 to transmit the location server 90 of FIG. 27 information indicating that an SS/PBCH block and/or CSI-RS is used as a PRS resource or information indicating that the SS/PBCH block and/or CSI-RS is transmitted to determine a TX/RX beam for transmitting and receiving the PRS resource.

The processor(s) 202 may configure the PRS resource. Specifically, the processor(s) 202 may configure the PRS resource by receiving information about a PRS resource configuration from the location server 90 of FIG. 27. The processor(s) 202 may configure the PRS resource according to the above-described embodiments. The processor(s) 202 may control the transceiver(s) 206 to transmit at least one of the PRS, SS/PBCH block, and CSI-RS to the first wireless device 100 and also control the transceiver(s) 206 to receive a report on the at least one of the PRS, SS/PBCH block, and CSI-RS from the first wireless device 100. In this case, included in the report may be configured according to the above-described embodiments, and the first wireless device 100 may transmit the report according to the above-described embodiments.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 24:
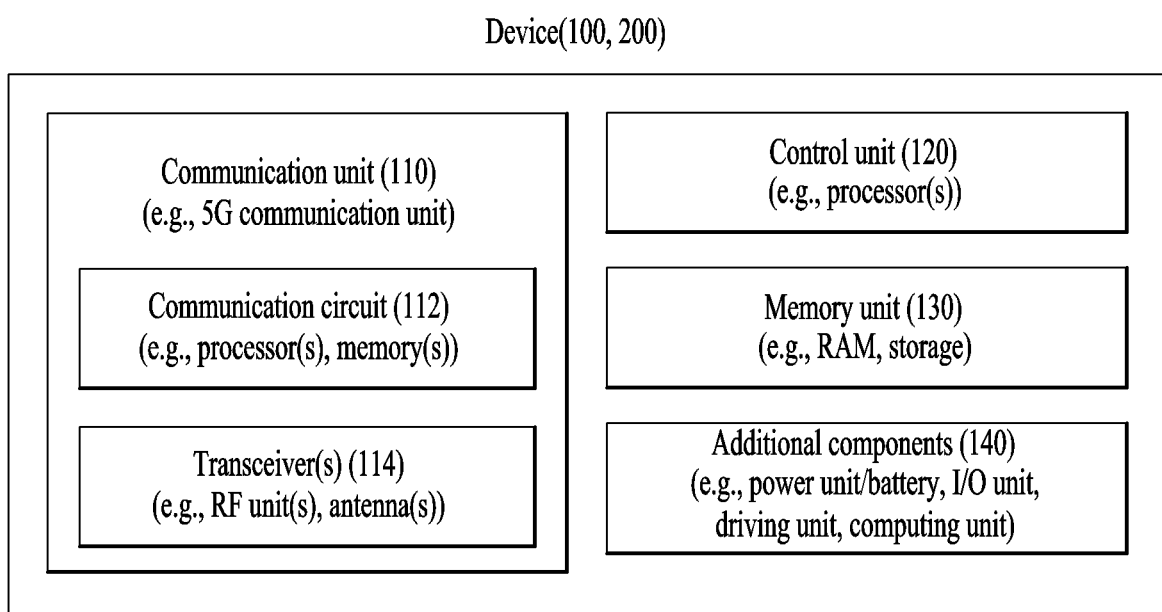

FIG. 24 illustrates another example of a wireless device applied to the present disclosure. The wireless device may be implemented in various forms according to a use case/service (refer to FIG. 22).

Referring to FIG. 24, wireless devices 100 and 200 may correspond to the wireless devices 100 and 200 of FIG. 20 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcasting terminal, a hologram device, a public safety device, an MTC device, a medical device, a FinTech device (or a finance device), a security device, a climate/environment device, the AI server/device (400 of FIG. 22), the BSs (200 of FIG. 22), a network node, or the like. The wireless device may be mobile or fixed according to a use case/service.

In FIG. 24, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 24 will hereinafter be described with reference to the attached drawings.

Figure 25:
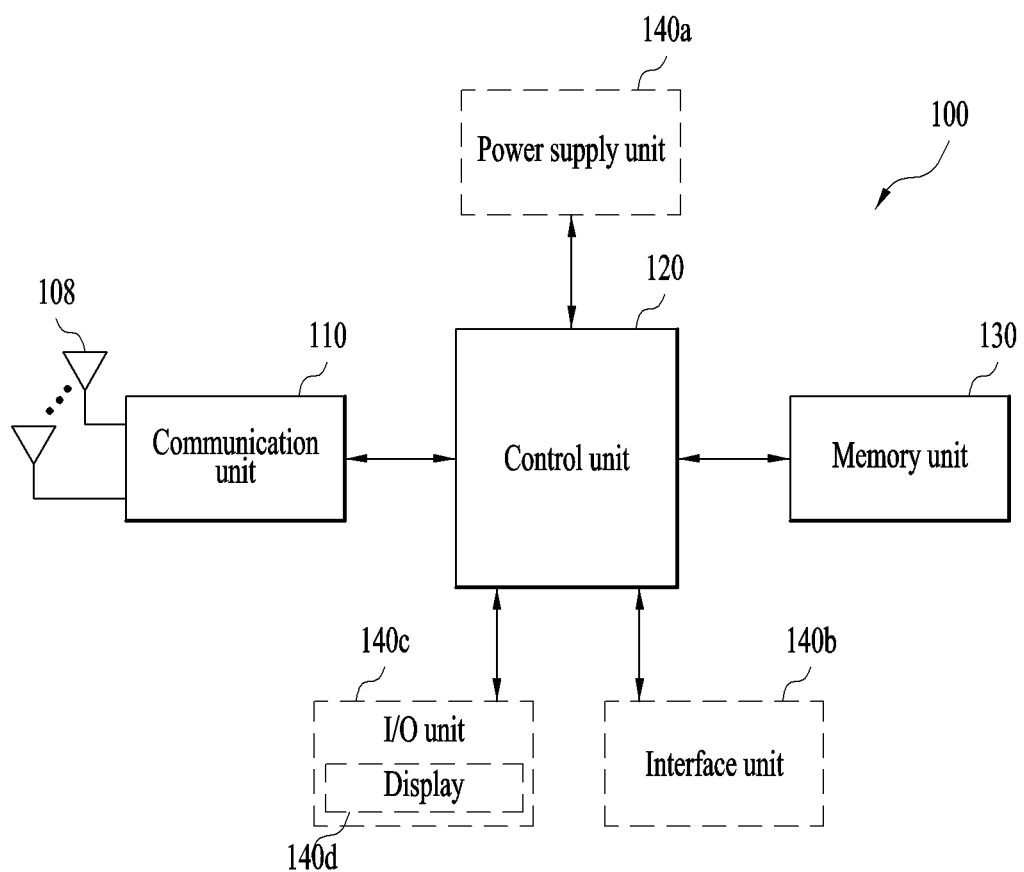

FIG. 25 is a block diagram illustrating a hand-held device 100 to which another embodiment of the present disclosure can be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 25, the hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. The blocks 110 to 130/140a to 140c correspond to the blocks 110 to 130/140 of FIG. 21, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140a may supply power to the hand-held device 100, and include a wired/wireless charging circuit and a battery. The interface unit 140b may support connection between the hand-held device and other external devices. The interface unit 140b may include various ports (e.g., an audio I/O port and a video I/O port) for connection to external devices. The I/O unit 140c may receive or output video information/signal, audio information/signal, data, and/or user-input information. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 26:
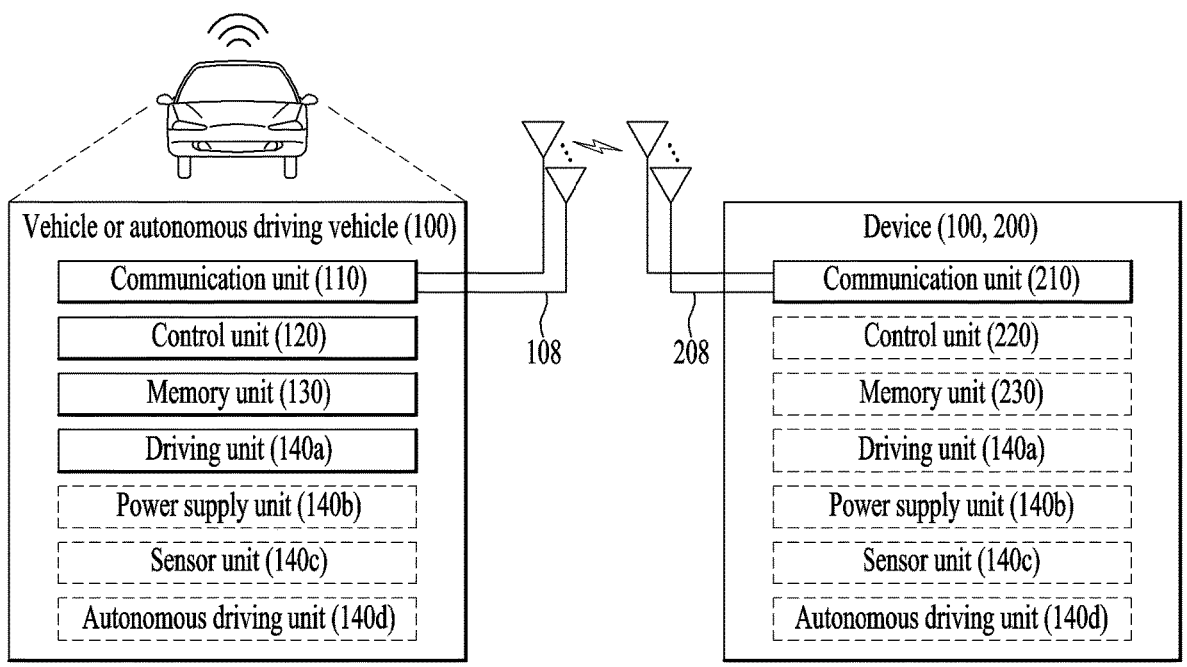

FIG. 26 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

For PRS transmission and location estimation based on the PRS according to the present disclosure, the location server 90 shown in FIG. 27 may be provided. The location server 90 may be logically or physically connected to a wireless device 70 and/or a network node 80. The wireless device 70 may be the first wireless device 100 of FIG. 23 and/or the wireless device 100 or 200 of FIG. 24. The network node 80 may be the second wireless device 100 of FIG. 23 and/or the wireless device 100 or 200 of FIG. 24.

The location server 90 may be, without being limited to, an AMF, an LMF, an E-SMLC, and/or an SLP and may be any device only if the device serves as the location server 90 for implementing the embodiments of the present disclosure. Although the location server 90 is referred to as a location server for convenience of description, the location server 90 may be implemented not as a server but as a chip. Such a chip may be implemented to perform all functions of the location server 90 which will be described below.

Specifically, the location server 90 includes a transceiver 91 for communicating with one or more other wireless devices, network nodes, and/or other elements of a network. The transceiver 91 may include one or more communication interfaces. The transceiver 91 communicates with one or more other wireless devices, network nodes, and/or other elements of the network connected through the communication interfaces.

The location server 90 includes a processing chip 92. The processing chip 92 may include at least one processor, such as a processor 93, and at least one memory device, such as a memory 94.

The processing chip 92 may control one or more processes to implement the methods described in this specification and/or embodiments for problems to be solved by this specification and solutions to the problems. In other words, the processing chip 92 may be configured to perform at least one of the embodiments described in this specification. That is, the processor 93 includes at least one processor for performing the function of the location server 90 described in this specification. For example, one or more processors may control the one or more transceivers 91 of FIG. 24 to transmit and receive information.

The processing chip 92 includes a memory 94 configured to store data, programmable software code, and/or other information for performing the embodiments described in this specification.

In other words, in the embodiments according to the present specification, when the memory 94 is executed by at least one processor such as the processor 93, the memory 94 allows the processor 93 to perform some or all of the processes controlled by the processor 93 of FIG. 23 or stores software code 95 including instructions for performing the embodiments described in this specification.

Specifically, instructions and/or operations, which are controlled by the processor 93 of the location server 90 and are stored in the memory 94, according to an embodiment of the present disclosure will now be described.

While the following operations will be described in the context of a control operation of the processor 93 from the perspective of the processor 93, software code for performing these operations may be stored in the memory 94. The processor 93 may control the transceiver 91 to receive from the second device 200 information indicating that an SS/PBCH block and/or CSI-RS is used as a PRS resource or information indicating that the SS/PBCH block and/or CSI-RS is transmitted to determine a TX/RX beam for transmitting and receiving the PRS resource.

The processor 93 may control the transceiver 91 to transmit PRS resource configuration information to the first wireless device 100 and/or second wireless device 200 of FIG. 23. In this case, the PRS resource may be configured according to the above-described embodiments. The processor 93 may control the transceiver 91 to receive a report on at least one of the PRS, SS/PBCH block, and CSI-RS from the first wireless device 100 or second wireless device 200. In this case, information included in the report may be configured according to the above-described embodiments, and the first wireless device 100 or second wireless device 200 may transmit the report according to the above-described embodiments.

Figure 28:
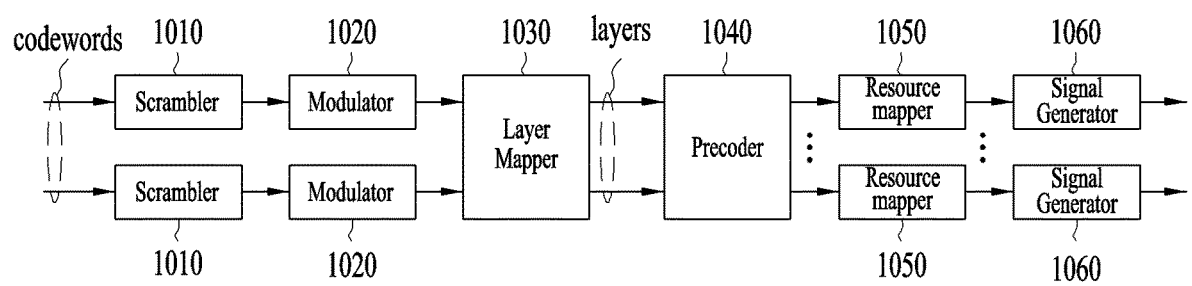
FIG. 28 illustrates an exemplary signal processing circuit to which embodiments of the present disclosure are applied.

FIG. 28 illustrates a signal processing circuit for transmission (Tx) signals.

Referring to FIG. 28, a signal processing circuit 1000 may include a scrambler 1010, a modulator 1020, a layer mapper 1030, a precoder 1040, a resource mapper 1050, and a signal generator 1060. The operations/functions shown in FIG. 28 may be performed by the processors 102 and 202 and/or the transceivers 106 and 206 shown in FIG. 23, without being limited thereto. Hardware elements shown in FIG. 23 may be implemented by the processors 102 and 202 and/or the transceivers 106 and 206 shown in FIG. 23. For example, the blocks 1010 to 1060 may be implemented by the processors 102 and 202. In addition, the blocks 1010 to 1050 may be implemented by the processors 102 and 202 shown in FIG. 23, and the block 1060 may be implemented by the transceivers 106 and 206 shown in FIG. 23.

The codeword may be converted into a radio signal (or a radio frequency (RF) signal) through the signal processing circuit 1000 shown in FIG. 28. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK (pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

The signal processing steps for reception (Rx) signals in the wireless device may be arranged in the reverse order of the signal processing steps 1010 to 1060 shown in FIG. 25. For example, the wireless devices 100 and 200 (shown in FIG. 20) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'mobile station (MS)', 'mobile subscriber station (MSS)', 'mobile terminal', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method of reporting information related to reference signal measurement and apparatus therefor have been described based on the 5G new RAT, the method and apparatus are applicable to various wireless communication systems as well as the 5G New RAT.

The invention claimed is:

1. A method of reporting information related to reference signal measurement by a user equipment (UE) in a wireless communication system, the method comprising:
   receiving a plurality of reference signals;
   measuring a time of arrival (ToA) for each of the plurality of reference signals; and
   transmitting identification information of a reference signal with a earliest ToA among the plurality of reference signals,
   wherein the plurality of reference signals are transmitted in a first frequency band and a second frequency band, and wherein a reference signal density of the first frequency band is different from a reference signal density of the second frequency band.

2. The method of claim 1, further comprising:
   measuring a reference signal received power (RSRP) for each of the plurality of reference signals,
   wherein the transmission of the identification information comprises transmitting identification information of a reference signal with a earliest ToA among reference signals having RSRPs greater than or equal to a threshold.

3. The method of claim 1, further comprising:
   measuring a reference signal received power (RSRP) for each of the plurality of reference signals; and
   transmitting an RSRP of the reference signal related to the identification information.

4. The method of claim 1, wherein the plurality of reference signals are a plurality of synchronization signal/physical broadcast channel (SS/PBCH) blocks, and wherein the identification information of the reference signal is an index of an SS/PBCH block.

5. The method of claim 1, wherein the plurality of reference signals are a plurality of channel state information reference signal (CSI-RS) resources included in one CSI-RS resource set, and wherein the identification information of the reference signal is a CSI-RS resource indicator (CRI).

6. The method of claim 1, wherein the plurality of reference signals are a plurality of positioning reference signal (PRS) resources included in one PRS resource set, and wherein the identification information of the reference signal is a PRS index.

7. The method of claim 1, wherein the plurality of reference signals are transmitted in a first frequency band and a second frequency band, and wherein a number of reference signal repetitions in the first frequency band is different from a number of reference signal repetitions in the second frequency band.

8. The method of claim 1, wherein the plurality of reference signals are for observed time difference of arrival (OTDOA) based positioning.

9. The method of claim 1, wherein each of the plurality of reference signals is mapped to a plurality of symbols, and wherein each of the plurality of reference signals is mapped to one resource element (RE) for each of the plurality of symbols.

10. The method of claim 1, wherein each of the plurality of reference signals is related to a different transmission beam.

11. The method of claim 1, wherein the UE is capable of communicating with at least one of another UE, a network, a base station, or an autonomous driving vehicle.

12. An apparatus for reporting information related to reference signal measurement in a wireless communication system, the apparatus comprising:
   at least one processor; and
   at least one memory operably connected to the at least one processor and configured to store instructions that, when executed, cause the at least one processor to perform operations comprising:
   receiving a plurality of reference signals;
   measuring a time of arrival (ToA) for each of the plurality of reference signals; and
   transmitting identification information of a reference signal with a earliest ToA among the plurality of reference signals,
   wherein the plurality of reference signals are transmitted in a first frequency band and a second frequency band, and wherein a reference signal density of the first frequency band is different from a reference signal density of the second frequency band.

13. A user equipment (UE) for reporting information related to reference signal measurement in a wireless communication system, the UE comprising:
   at least one transceiver;
   at least one processor; and
   at least one memory operably connected to the at least one processor and configured to store instructions that, when executed, cause the at least one processor to perform operations comprising:
   receiving a plurality of reference signals through the at least one transceiver;
   measuring a time of arrival (ToA) for each of the plurality of reference signals; and
   transmitting identification information of a reference signal with a earliest ToA among the plurality of reference signals through the at least one transceiver,
   wherein the plurality of reference signals are transmitted in a first frequency band and a second frequency band, and wherein a reference signal density of the first frequency band is different from a reference signal density of the second frequency band.

* * * * *